Oct. 20, 1942.   T. A. KEEN ET AL   2,299,396
TICKET PRINTING AND ISSUING MACHINE
Filed Aug. 7, 1939   13 Sheets-Sheet 3
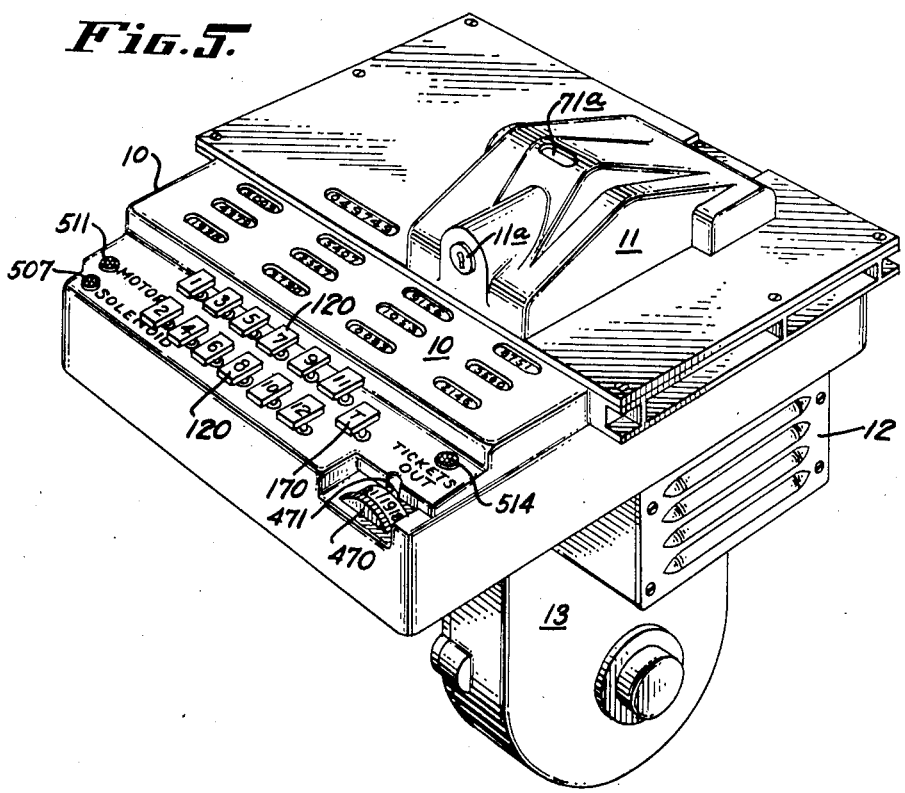
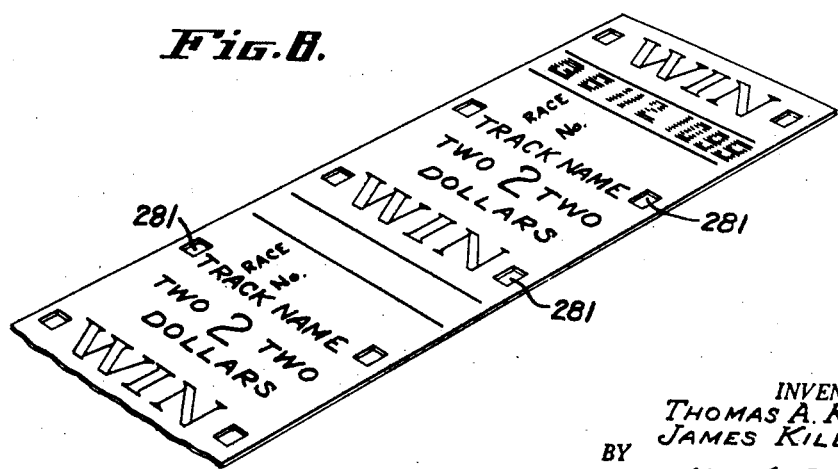
INVENTORS
THOMAS A. KEEN
JAMES KILBURG
BY
Chas. E. Townsend
ATTORNEY.

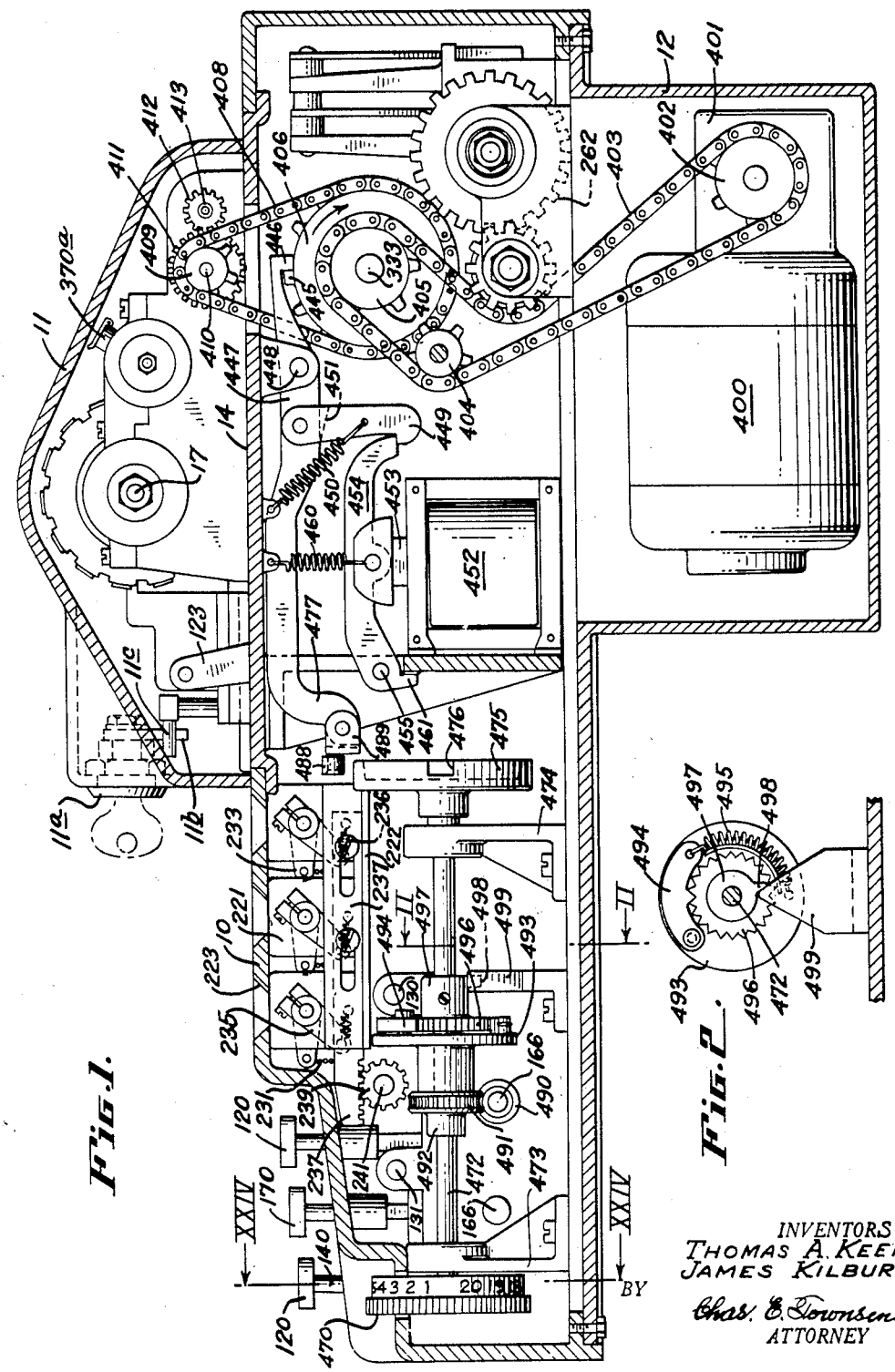

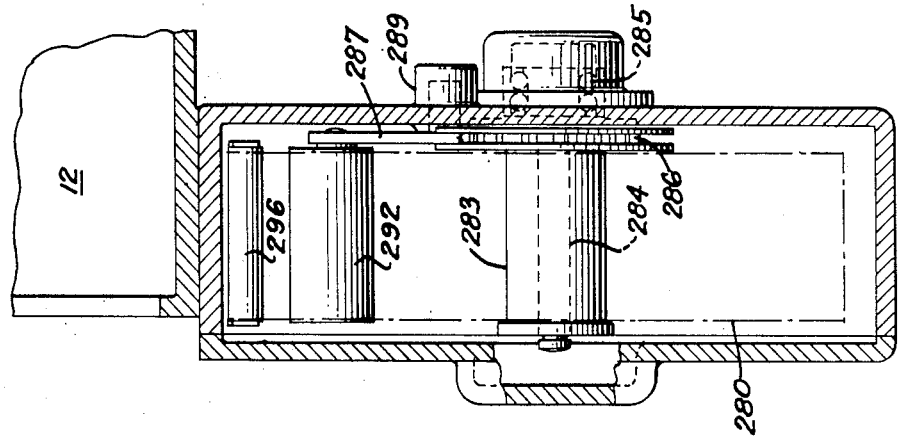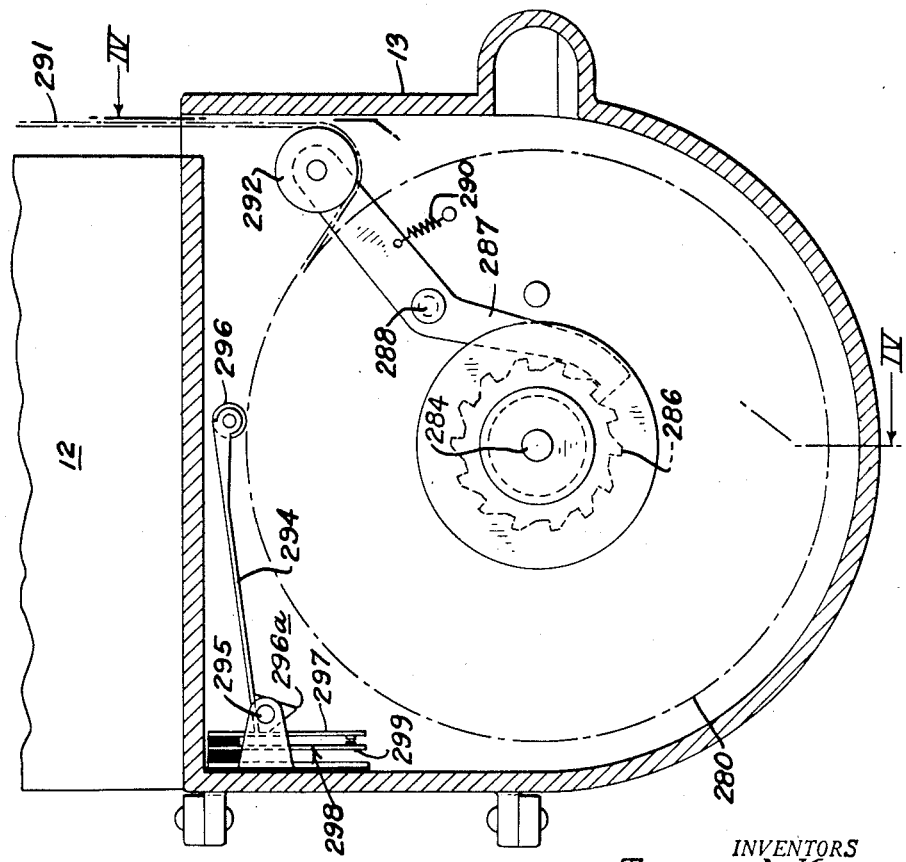

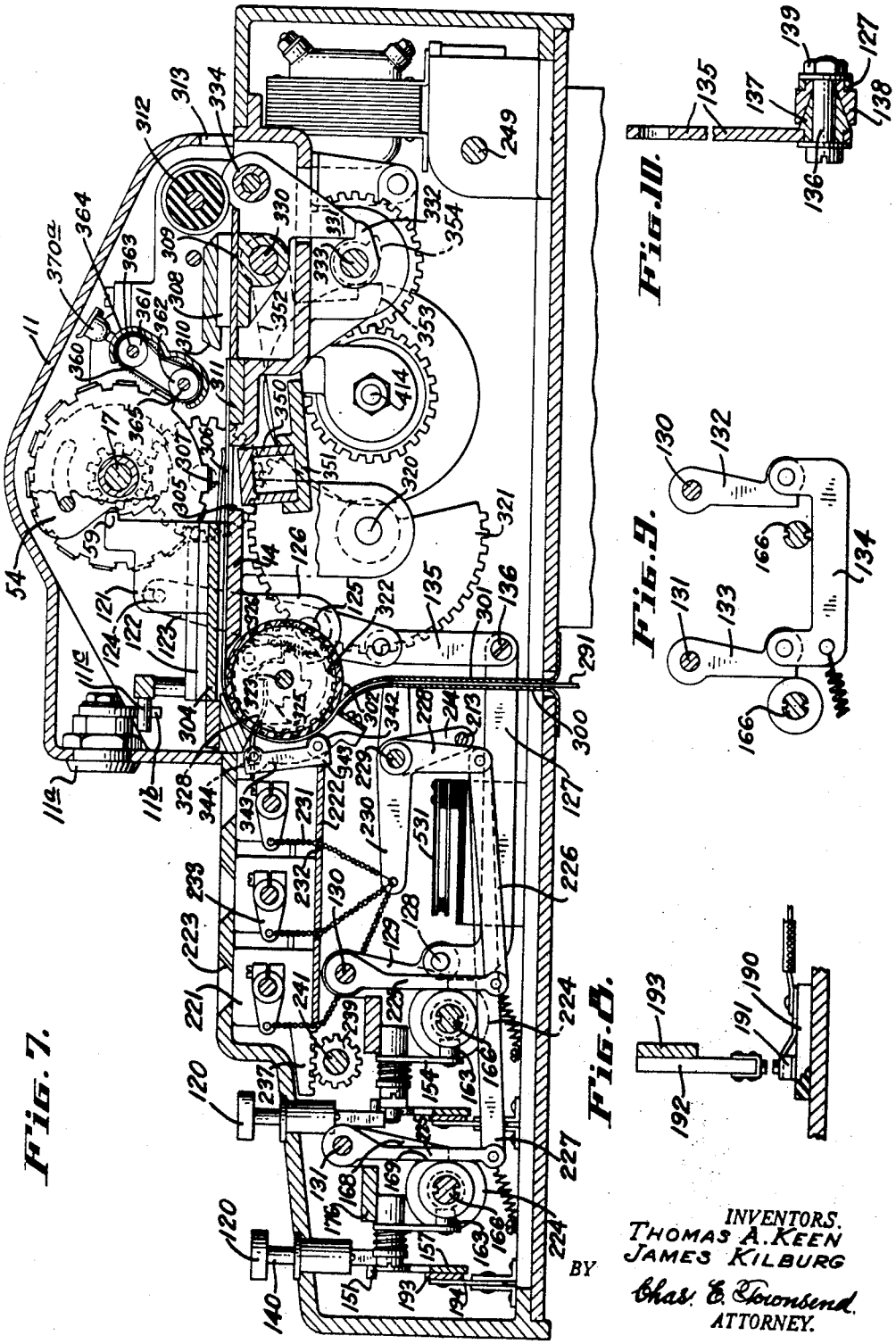

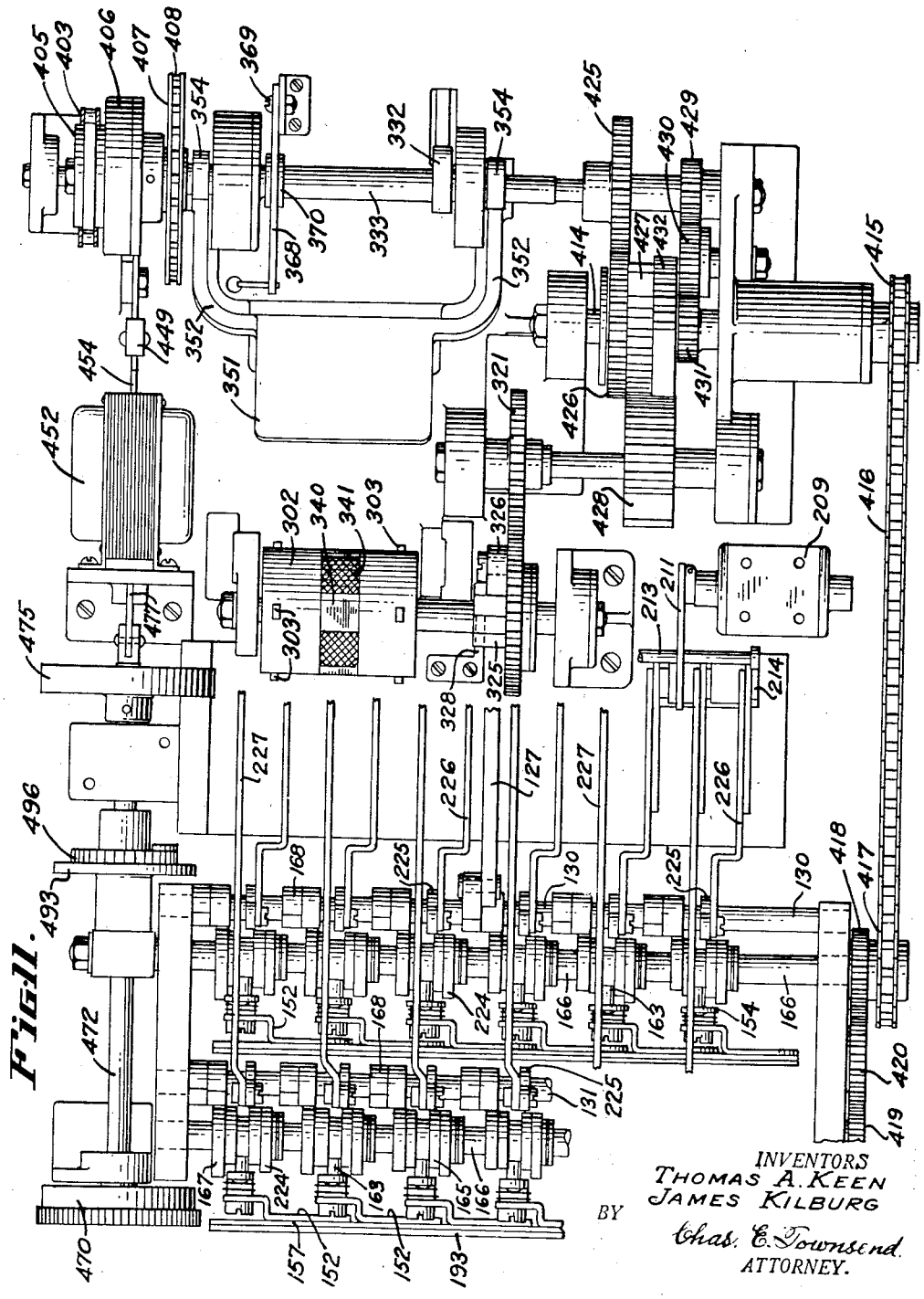

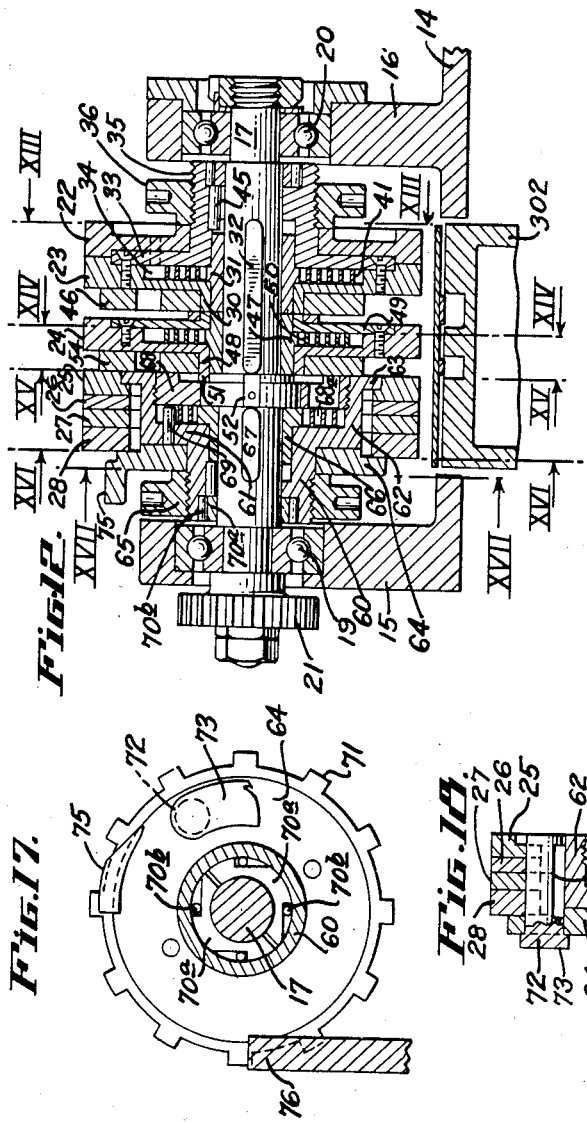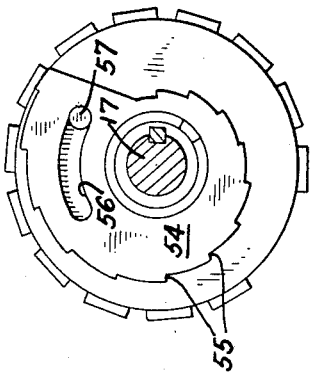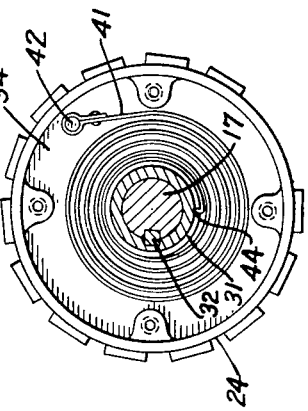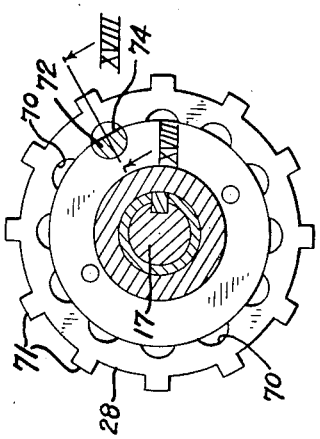

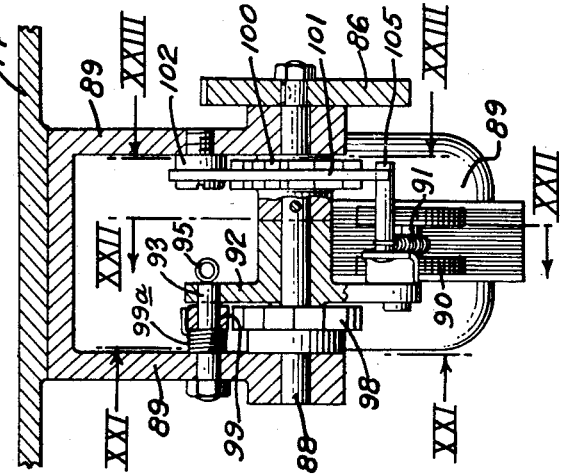

Oct. 20, 1942.  T. A. KEEN ET AL  2,299,396
TICKET PRINTING AND ISSUING MACHINE
Filed Aug. 7, 1939  13 Sheets-Sheet 8
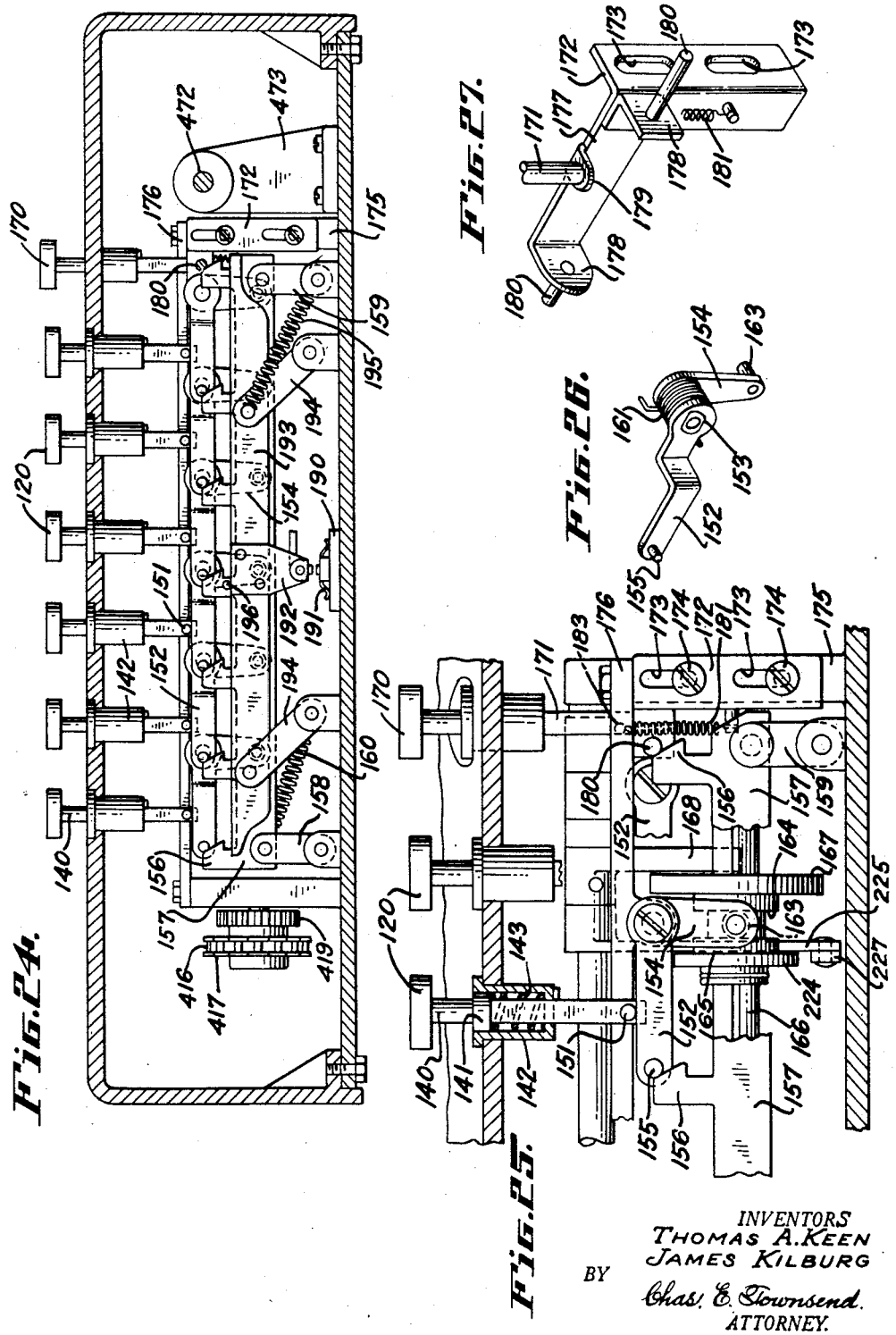
INVENTORS
THOMAS A. KEEN
JAMES KILBURG
BY
Chas. E. Townsend.
ATTORNEY.

Oct. 20, 1942.　　　T. A. KEEN ET AL　　　2,299,396
TICKET PRINTING AND ISSUING MACHINE
Filed Aug. 7, 1939　　　13 Sheets-Sheet 9
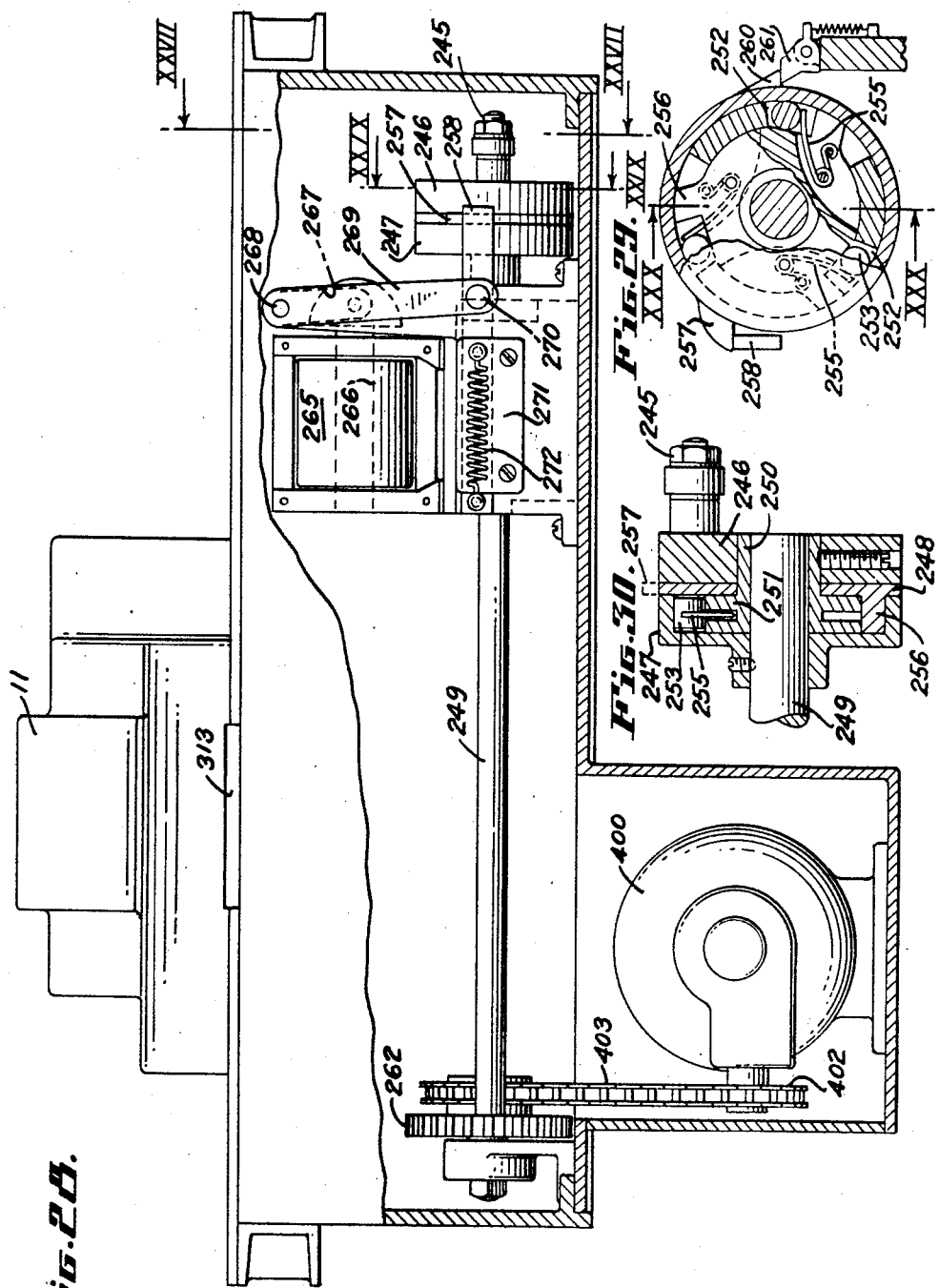
INVENTORS
THOMAS A. KEEN
JAMES KILBURG
BY
Chas. E. Townsend
ATTORNEY.

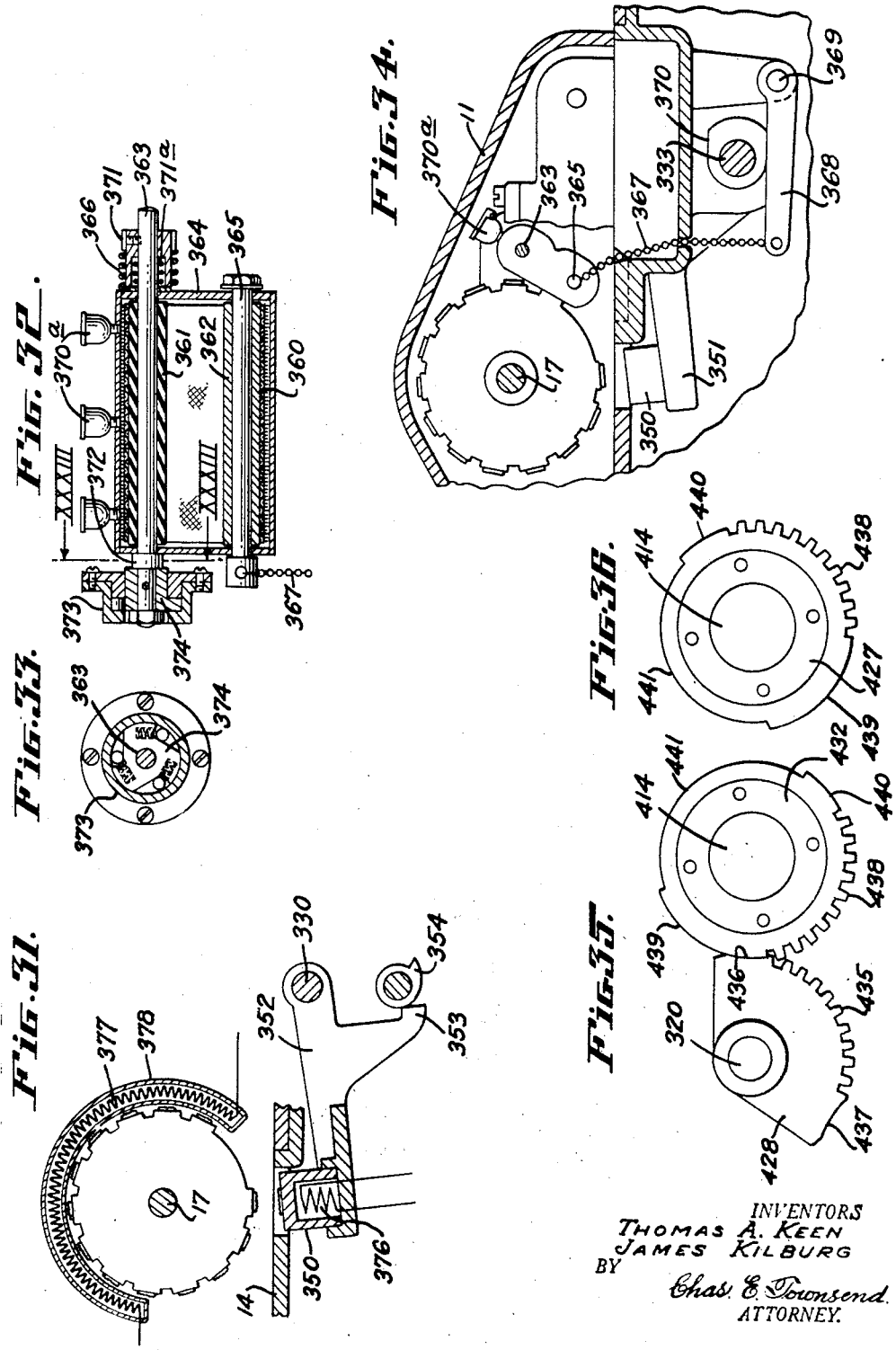

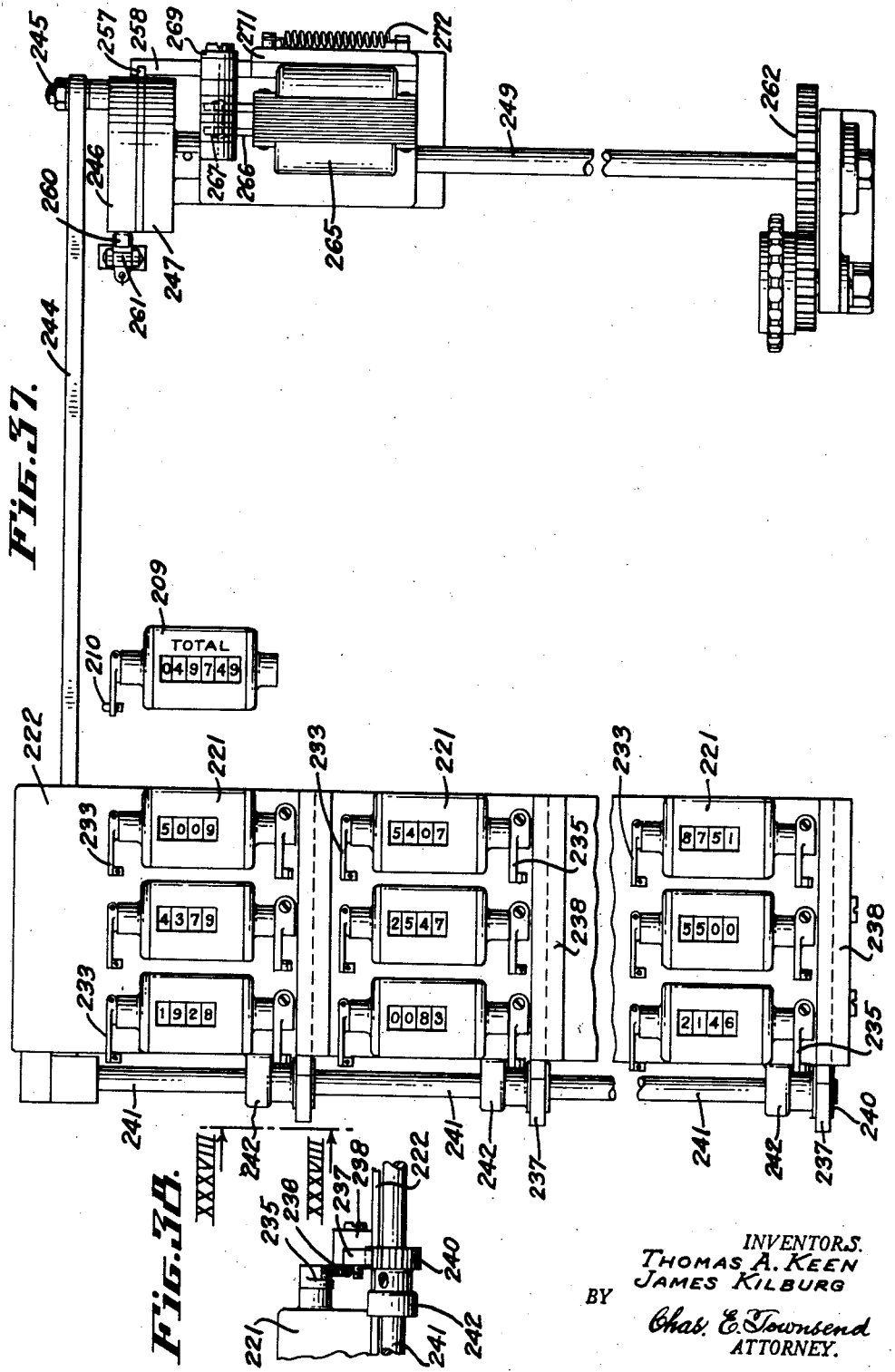

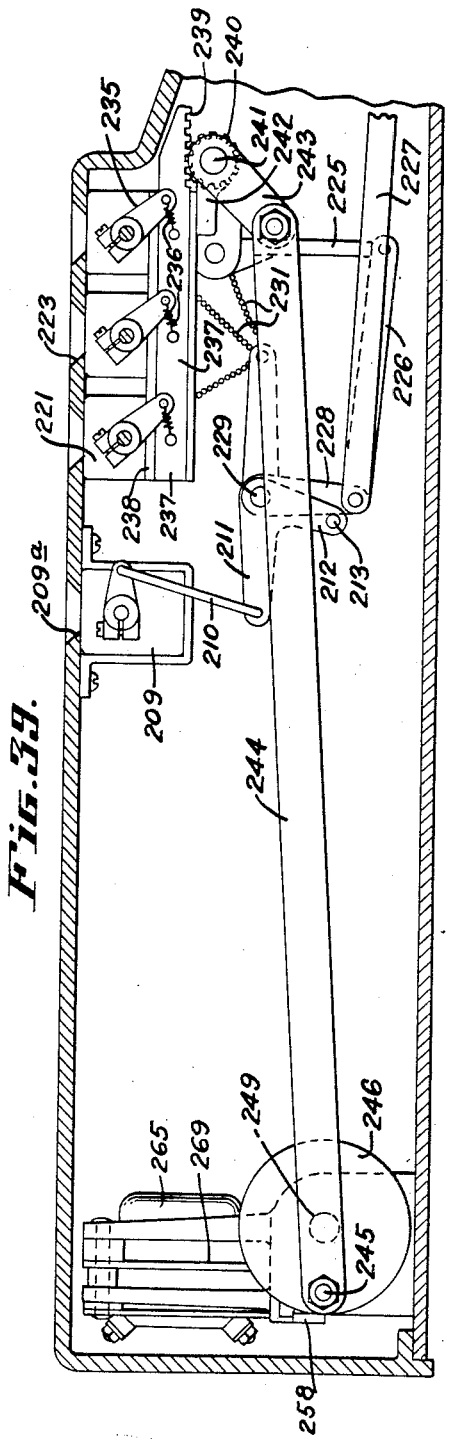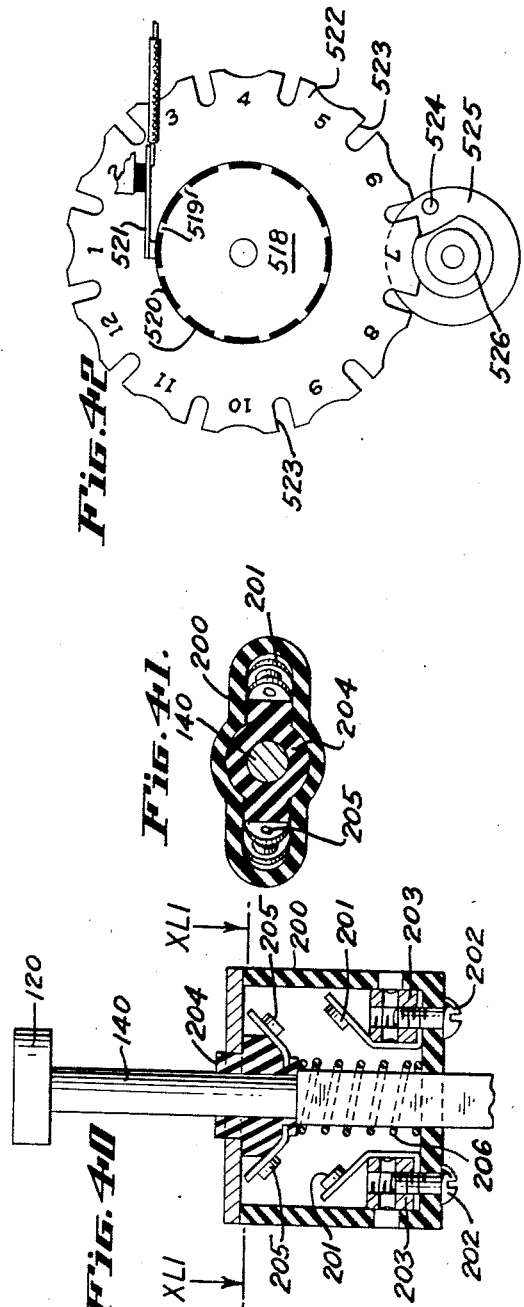

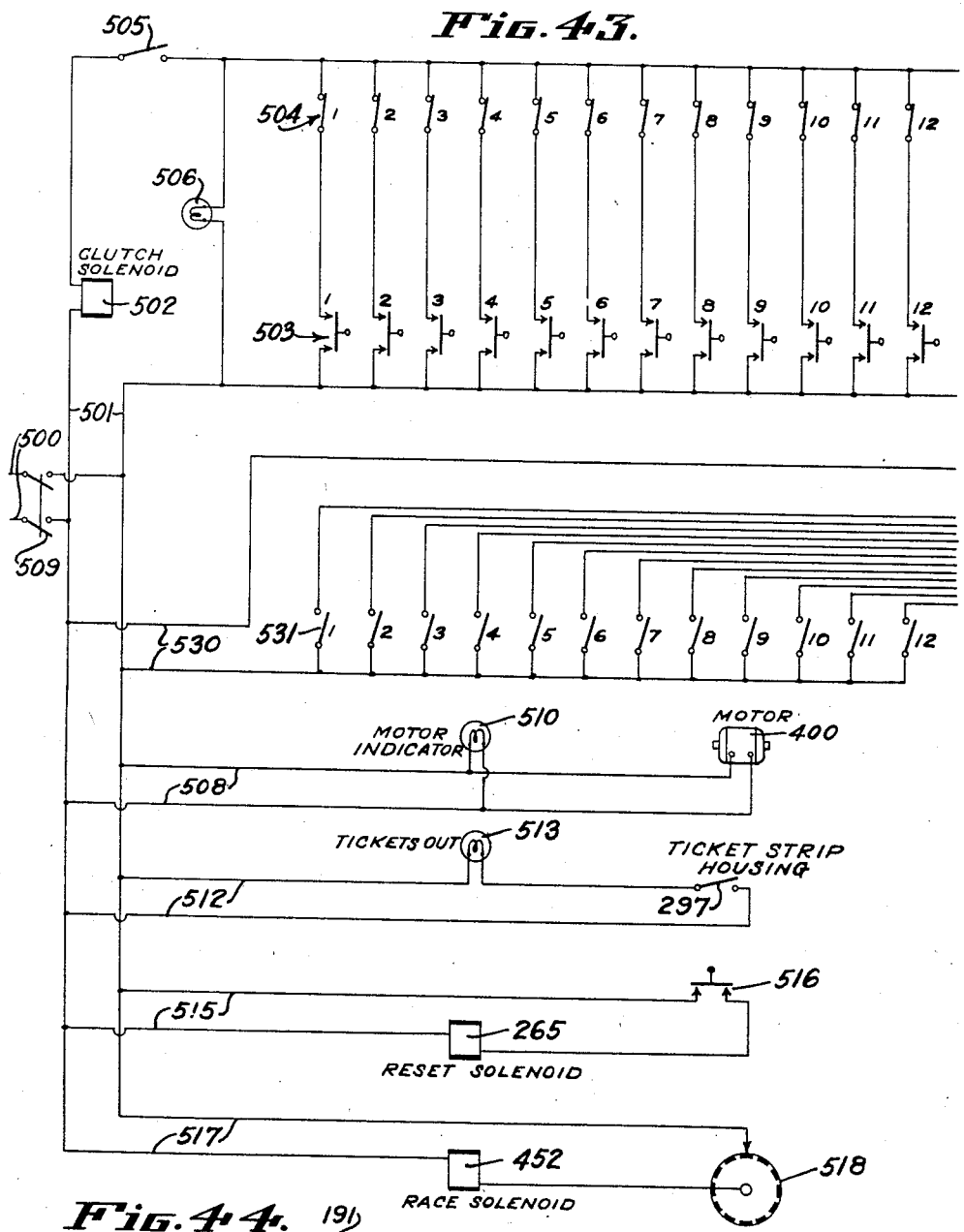
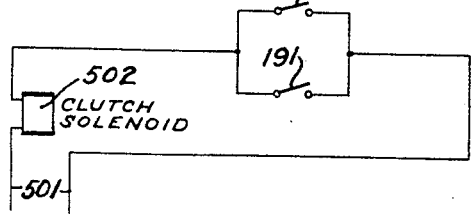

Patented Oct. 20, 1942

2,299,396

UNITED STATES PATENT OFFICE 2,299,396

TICKET PRINTING AND ISSUING MACHINE

Thomas A. Keen, San Mateo, and James Kilburg, Redwood City, Calif., assignors, by direct and mesne assignments, of one-half to Thomas A. Keen, and one-half to Hannah M. Smith, Chicago, Ill.

Application August 7, 1939, Serial No. 288,840

2 Claims. (Cl. 101—97)

The present invention relates to machines for printing and issuing tickets, and particularly to a machine of the kind used for issuing tickets as receipts for bets upon entries in a race, and for printing upon each ticket the number of the race, the number of the entry upon which the bet is placed, the date, and other desired identifying matter.

It is the object of the invention generally to improve the structure and operation of ticket printing and issuing machines and to provide in such a machine means to insure simple, accurate, and rapid printing, issuing, and registry of the number of tickets issued.

It is further the object of this invention to provide a machine in which either a single ticket may be issued and its sale registered, or in which a pre-determined plurality of tickets may be sold and registered by a single operation of the machine upon a convenient setting of the machine to the number of tickets to be issued.

A further object is to provide, in connection with counters for registering the sales of tickets on individual entries, a motor actuated electrically controlled re-set, capable of operation by closing a single circuit to re-set to zero all of the counters on one or a plurality of machines, and to provide counters in which the counter actuating power is derived from a motor driven part of the machine, and further, to provide means insuring against operation of the machine to issue a ticket on any particular entry or to register on the corresponding counter in the event that said entry has been withdrawn or scratched from the race.

A still further object is the provision in a machine of this character of a printing mechanism capable of rapid and accurate selection of type to be printed, and having means to prevent smearing or offsetting of the fresh ink used in printing; or capable of printing without ink, in which case the type impression is distinctly colored through the medium of pressure, heat, and a thermo-sensitive chemical.

Further objects are to provide novel strip feeding mechanism by means of which a ticket strip is fed to the printing mechanism, and which includes means for retaining a supply roll of the ticket strip in a tightly coiled condition, means for indicating that the supply has diminished beyond a pre-determined point, and means for printing upon the back of the strip a number identifying the strip and tickets printed thereon with the particular machine upon which they have been printed; and to provide operating mechanism capable of producing especially rapid and smooth operation of the printing and issuing mechanism and including a single cycle clutch of the over-running type and a novel form of double-acting, constant speed, Geneva movement for transmitting power for movement in opposite directions to the printing head during type selection and to the strip feeding mechanism.

Further specific objects and advantages of the invention will be made apparent in the following detailed description, in which reference is made to the accompanying drawings illustrating a ticket printing and issuing machine embodying the invention.

In the drawings—

Fig. 1 is a side elevation of the ticket printing, selecting, and drive portions of a machine embodying the present invention, the casing being broken away to disclose portions of the mechanism;

Fig. 2 is a sectional view of detail taken on line II—II of Fig. 1;

Fig. 3 is a side elevation of mechanism which supports the paper strip upon which tickets are printed, the casing being shown in section;

Fig. 4 is a sectional view taken on line IV—IV of Fig. 3;

Fig. 5 is a perspective view of the exterior of the machine;

Fig. 6 is a perspective view of a portion of a ticket strip printed by the machine;

Fig. 7 is a central vertical section through the ticket printing and selector mechanism;

Fig. 8 is an enlarged detail view in section of one of the switches illustrated in Fig. 7;

Fig. 9 is a detail view of a portion of the selecting mechanism;

Fig. 10 is a detail view in section of another portion of said mechanism;

Fig. 11 is a view of the ticket printing and selecting mechanism looking up from the bottom of the machine with the casing and a portion of the selecting mechanism removed;

Fig. 12 is a vertical transverse section taken through the printing head of the machine;

Fig. 13 is a section taken on line XIII—XIII of Fig. 12;

Fig. 14 is a section taken on line XIV—XIV of Fig. 12;

Fig. 15 is a section taken on line XV—XV of Fig. 12;

Fig. 16 is a section taken on line XVI—XVI of Fig. 12;

Fig. 17 is a section taken on line XVII—XVII of Fig. 12;

Fig. 18 is a fragmentary section taken on line XVIII—XVIII of Fig. 16;

Fig. 19 is a sectional view of the printing head and a portion of the selecting mechanism associated therewith, illustrating in particular the race disc selector;

Fig. 20 is a section taken on line XX—XX of Fig. 19;

Fig. 21 is a section taken on line XXI—XXI of Fig. 20;

Fig. 22 is a section taken on line XXII—XXII of Fig. 20;

Fig. 23 is a section taken on line XXIII—XXIII of Fig. 20;

Fig. 24 is a section taken on line XXIV—XXIV of Fig. 1;

Fig. 25 is an enlarged detail view with parts shown in section of a portion of the mechanism illustrated in Fig. 24;

Fig. 26 is a perspective view illustrating details of a portion of the mechanism shown in Fig. 25;

Fig. 27 is a perspective view illustrating other details of the mechanism shown in Fig. 25;

Fig. 28 is a rear view of the machine with portions of the casing broken away;

Fig. 29 is an end elevation with parts in section as viewed from line XXIX—XXIX of Fig. 28;

Fig. 30 is a sectional view taken on line XXX—XXX of Fig. 29;

Fig. 31 is a diagrammatic sectional view of a portion of the printing head illustrating means for heating the type and platen;

Fig. 32 is a transverse section taken through an inking mechanism;

Fig. 33 is a sectional detail taken on line XXXIII—XXXIII of Fig. 32;

Fig. 34 is a side elevation of a portion of the printing head and inking mechanism, illustrating the respective positions of these parts and the mechanism which operates the inking mechanism;

Fig. 35 is a side elevation of Geneva gears which form a part of the power transmission mechanism;

Fig. 36 is a side elevation of another of said gears;

Fig. 37 is a plan view showing details of operation of a counter re-set mechanism which is illustrated in Figs. 28 to 30;

Fig. 38 is a front elevation of the mechanism illustrated in Fig. 37, as viewed from the line XXXVIII—XXXVIII;

Fig. 39 is a side elevation of the mechanism illustrated in Fig. 37;

Fig. 40 is a vertical transverse sectional view of a form of key-actuated switch and housing therefor;

Fig. 41 is a sectional view taken on line XLI—XLI of Fig. 40;

Fig. 42 is a view in elevation of an electric switch adapted to be used in connection with the race selecting solenoid;

Fig. 43 is a simplified wiring diagram illustrating the circuits in the ticket printing and issuing machine and control room; and Fig. 44 is a diagrammatic view illustrating a modification of one of the circuits illustrated in Fig. 43.

The machine, as most clearly illustrated in Figs. 1, 3 and 5, includes a main housing 10 which supports a keyboard and which encloses most of the key actuated selecting mechanism, the registering mechanism, and the power transmission. Surmounting the casing 10 is a removable cover 11 which encloses the principal portions of the ticket printing mechanism. Beneath the case 10 is a motor housing 12. Also positioned beneath the main case 10 and, as shown in the present instance, depending from the bottom of the motor housing 12, is a housing 13 which encloses a supply roll in the form of a paper strip upon which the tickets to be issued are printed upon operation of the machine.

*Printing mechanism*

Details of construction of the printing mechanism which is enclosed by the cover 11 are best illustrated in Figs. 1, 7 and 12 to 18 inclusive. This mechanism is supported on a table 14 which is disposed on the plane of the top surface of the case 10 and occupies an opening provided for its reception in the top of the case. Extending upwardly from the table 14 are a pair of bearing brackets 15 and 16, preferably cast integrally with the table, and supporting a main printing head assembly shaft 17. This shaft, which is journaled in ball bearings 19 and 20 supported by the bearing brackets 15 and 16 respectively, acts as a support for the rotary die members of the printing head. The shaft is operated during operation of the machine through slightly more than 360° and then reversed to assume its original position through drive mechanism, hereinafter to be described in detail, which is connected with the shaft through the medium of a gear 21 secured to the shaft adjacent its left hand end as viewed in Fig. 12. Mounted on the shaft 17 are a plurality of disc-like multi-faced type members for impressing upon a ticket passing beneath the printing head, the date, the number of an entry on which a bet has been placed and for which the ticket is to be issued, the number of the race in which the bet was made, and a symbol in code corresponding to the race number and properly identifying the ticket as having been printed for that race and as not having had the race number thereon fraudulently changed. The ticket strip is preferably pre-printed with other data such as its value, the name of the track, etc.

Referring to Fig. 12 of the drawings, the code disc last referred to is shown at 22, the race disc is shown at 23, the entry disc at 24, and the date is printed by four relatively adjustable discs 25, 26, 27, and 28. The disc 25 bears on its periphery numbers from 1 to 12 for indicating the month. The discs 26 and 27 bear identical type, each carrying consecutive digits so that by adjustment of the two any day of the month may be printed; and the disc 28 bears type for printing the year.

The race disc 23 is mounted for limited rotation relative to the main shaft 17 by means of a central hub 30 rotatably mounted on a collar 31 which is keyed to the shaft 17 by means of a key 32. Secured to the right hand face of the race disc 23 is a plate 33 which cooperates with a recessed face of the disc to form an annular spring chamber 34 surrounding the main shaft. The plate 33 carries an axial hollow trunnion 35 exteriorly threaded for the reception of a hand nut 36 by means of which the code disc 22 is immovably secured against the race disc 23. The code disc 22, also illustrated in Fig. 13, carries twelve spaced die members 37 adapted to align with similar die members on the race disc and carrying type to print symbols identifying the race number by code. As it is desirable that the code symbols be changed for each day of racing, a plurality of code discs with differently arranged symbols are provided and so designed that they may be readily interchanged and securely fastened to the race wheel in positive alignment therewith. To this end the code discs, as shown in Fig. 13, are formed with a gap 38 co-extensive with the central opening which embraces the trunnion 35 and extending through the periphery of the disc. The code discs are also provided with openings for the reception of dowel pins 39 and 40 extending from the face of the plate 33 to locate the code disc with its type faces in proper alignment with the type faces of the race disc 23. The dowels 39 and 40 are preferably spaced unequal distances from the center of the main shaft to insure against improper positioning of the disc. When the code disc is placed over the trunnion 35 and moved into abutting relation with the race disc 23 until the dowels 39 and 40 project into their respective openings, the hand nut 36 is tightened so that the code disc and race discs are firmly secured together and move in unison. The spring chamber 34, which is formed in the face of the race disc 23, is also shown in Fig. 14, and contains a spiral spring 41 which serves to connect the discs with the main shaft 17. One end of the spring 41 is secured to a pin 42 in the spring chamber. The opposite end thereof is turned into a recess as shown at 44 in the collar 31. The spring 41 serves to transmit rotary motion from the shaft 17 to the discs 22 and 23, but is sufficiently resilient to permit the shaft to rotate through the greater part of 360°, although rotation of the discs may be interrupted at any point by selector mechanism which determines the type face thereon to be used in the printing operation. In order that rotation of the discs will commence immediately upon rotation of the shaft 17, the spring 41 is normally pre-loaded, the load being imposed by rotating the discs in a forward direction a short distance relative to the shaft 17 and then preventing reverse rotation by means of a pin 45 (see Figs. 12 and 13) which engages with the key 32.

Upon a ticket printing operation the shaft 17 will be rotated forwardly in excess of 360° and then returned to its initial position. During the forward movement of the shaft 17 the discs 22 and 23 will be carried with the shaft through the connection afforded by the spring 41. These discs, however, may be brought to a stop at any point during their rotation to cause the proper type faces to align for printing, and the continued movement of the shaft after the discs have stopped is taken up by the spring. In order that the discs may be caused to stop at any desired point, a race selector stop plate 46, presently to be described in detail, is associated with the race disc 23.

The entry disc 24 is similar in construction to the race disc 23, except that no provision is made for an associated code disc, and is rotatably mounted on a collar 47, similar to the collar 31, by means of a hub 48, and has a cover plate 49 similar to the cover plate 33. The spring chamber of this disc carries a spring 50 identical with that of the race disc which is normally retained in a partially loaded condition by engagement between a projection 51 on the edge of the bearing member 48 and a key 52 formed in an enlarged portion of the shaft 17 and aligned with the key 32. A selector stop plate 54 which determines the printing position of the entry disc 24 upon operation of the shaft 17 corresponds to the selector stop plate 46 on the race disc.

The construction of the selector stop plate 54 on the entry disc and selector stop plate 46 on the race disc is identical and these plates, as illustrated in Fig. 15, are provided with stop shoulders 55 corresponding in number and circumferential spacing with the type faces 37 of the discs, but spaced progressively outwardly from the axis. The stop plates are rotatable with relation to their respective discs for a distance limited by a 60° arcuate slot 56 into which projects a pin 57 anchored in the disc itself. A selector finger which is capable of adjustment toward and away from the axis of the stop plate operates to engage a selected one of the shoulders 55 and thereby stop rotation of the plate and consequently rotation of its type disc at the point selected. The selector finger, operating with the plate 46, is shown at 58 in Fig. 19, and the finger which operates with the plate 54 is shown at 59 in Fig. 7. The type faces of the discs 22, 23, and 24, which are brought into printing position upon rotation of the shaft 17 are therefore determined by the positioning of the selector fingers, which interrupt the rotation of the selector plates 46 and 54. The 60° arcuate slot 56 in the plates permits the type disc to rotate a limited distance after the selector plate has been stopped by the selector finger so that any type face selected will have passed a predetermined point at which an inking device is positioned. There is also on the periphery of each of the type discs a 60° space in which no type appears so that any rotary movement of the type disc will cause the selected type thereon to come in contact with the inking device.

The date discs 25, 26, 27 and 28 are supported by a bushing 60 which extends outwardly as at 61 to support a drum 62 with a flange 63 thereon. The date discs slide over the drum 62 and are secured between the flange 63 and a plate 64 by means of a lock nut 65 threaded to the exterior of the bushing 60. The bushing 60 is rotatably mounted with respect to a collar 66 which is keyed to the shaft 17 by a key 67. A threaded ring 68 is screwed into the open end of the drum 62 leaving a spring chamber 68a within the drum for a coil spring which acts in the manner of the springs heretofore described in connection with the race and entry discs. A pin 69 is carried by the bushing 60 in a position for engagement with the key 67 to retain the spring in a partially loaded condition. In order that the date wheels may be set from day to day to change the date to be printed on the ticket, they are mounted for rotation with respect to the drum 62. Each of the date wheels is provided with semi-circular notches 70 as shown on the date wheel 28 in Fig. 16.

These notches correspond in number and spacing to type faces 71 arranged peripherally of the date discs. When the type faces of the four date discs are adjusted and aligned to print a certain date, the notches 70 are aligned for reception of a locking pin 72 shown in Figs. 16, 17, and 18 as journaled in and projecting through the plate 64. This locking pin 72 is provided at its outer end with a hand lever 73 by means of which it may be rotated through 180°. The portion of the pin 72 which extends through the four date discs is cut away as at 74 to present a flat side over which the discs may be rotated for adjustment, as shown in Fig. 16, when the locking pin is rotated to one position; and to present a cylindrical side entering the aligned notches 70 when the locking pin is moved to the opposite position by means of the hand lever 73, as illustrated in Fig. 17 and Fig. 18. The locking pin is held in place by the nut 65, the lever 73 occupying the space between this nut and the plate 64, which space is shown in Fig. 12, although the locking pin does not appear therein.

The date discs need be set but once a day, and this setting is accomplished by loosening the nut 65, then rotating the locking pin to the unlocked position shown in Fig. 16, and then adjusting the discs until the type faces 71 thereon bearing the desired date occupy the position illustrated at the extreme left in Fig. 17. Upon a ticket printing operation, the type faces thus arranged will be moved to the lowermost position on the date discs, at which position the printing takes places. This is effected by the forward rotation of the shaft 17 which, through the loaded spring which acts like the spring 41 in Fig. 14, carries with it the date discs until a lug 75 on the plate 64 (see Fig. 17) engages a stop post 76.

The peripheries of the date discs are preferably provided with numerals intermediate the raised type faces, which numerals correspond to the numerals on the type faces but are arranged so as to indicate from a normal uppermost position the numeral on the type face that will be printed when the date discs come to rest with the lug 75 in contact with the top post 76. These numerals may be viewed through a window 71a (see Fig. 5) in the top of the cover 11 which encloses the ticket printing mechanism.

The printing discs carried by the shaft 17 and particularly the race and date discs have substantial weight, and upon being abruptly stopped at their respective printing positions, have a tendency to rebound, which is undesirable. In order to prevent this rebound a pair of brake shoes 70a (as shown in Fig. 17) embrace the shaft at opposite ends. The shoes 70a have semi-cylindrical outer edges which are provided with chambers for the reception of rollers 70b. These outer edges are embraced by the bushings 35 and 60 adjacent the opposite ends of the shaft 17, during simultaneous movement of the shaft 17, shoes 70a and the bushing 35 or 60, the rollers 70b have no effect. However, when the bushing 35 or 60 is stopped, the rollers 70b, which tend to stop with it, become wedged in the narrow ends of their chambers and serve to press the shoes 70a toward each other and into braking relation with the shaft 17. This creates a drag between the shaft and the printing disc, which is sufficient to overcome the tendency of the disc to rebound, though not sufficient to prevent continued forward movement of the shaft until it attains its intended stopped position.

The cover 11 is designed conveniently to be removed to facilitate adjusting the date printing discs, changing the code wheel, or making other adjustments to the printing mechanism. The cover 11 may, for example, rest on top of the main housing as illustrated in Fig. 1, and may be provided with any convenient locating or securing means not shown. It is desirable, however, that unauthorized removal of this cover be prevented and to this end a key actuated lock, generally indicated at 11a, is shown as controlling a hook-shaped latch 11b which engages beneath a latch post 11c.

Race disc selector

As just described, the date selected to be printed upon rotation of the shaft 17, which supports the printing head, is determined by a fixed lug associated with the date discs and a fixed stop member, because once the date discs have been adjusted the date to be printed is always the same. In the case of the race disc 23 and its associated code disc 22, however, the type faces to be printed must be changed with every race. There are on these discs twelve type faces numbered consecutively from one to twelve, and a thirteenth type face bearing a character symbolic of trial operation of the machine, as, for example, a T.

Referring to Fig. 19, which illustrates the printing head in a section taken between the code disc 22 and the race disc 23, but diagrammatically to the extent that the race disc is shown in outline only and the associated selector plate 46 shown in dotted lines, the race disc selector finger 58 is shown as cooperating with one of the stop shoulders 55 on the selector plate 46, and as having brought the race disc to a stop with the selected race number and code symbol in the lowermost or printing position. The selector finger 58 is adjustable to and from the shaft 17 for engagement with any one of the stop shoulders 55 to effect printing of the race number carried by the type face corresponding to the selected stop shoulder. In the position illustrated in Fig. 19, the lowermost type face has been carried by rotation of the shaft 17 in a clockwise direction from its normal position, which is the same as that shown, throughout 360°. During rotation of the shaft 17 through slightly more than 360°, the pin 57 moved through the length of the slot 56 and the selector finger 58 engaged the number twelve stop shoulder 55, thus causing the race disc to come to rest with the number twelve type face in the printing position shown. By advancing the selector finger toward the shaft 17, it may be positioned to engage any one of the stop shoulders 55 of the selector plate. In order that the finger may be advanced, it is formed as a part of a block 80 which is mounted for sliding movement in a track 81. A lever 82 pivoted at 83 engages the block 80 through a pin and slot connection 84. The lower arm of the lever 82, which is just half the length of the upper arm, carries a laterally extending pin 85 engaging the stepped surface of a cam 86, the steps of which are spaced radially from the center of the cam in increments equal to half the spacing of the steps on the selector plate 46. A spring 87 urges the pin 85 into contact with the stepped periphery of the cam 86. The cam 86, as illustrated in Fig. 20, is keyed to a shaft 88 journaled in brackets 89 which extend downwardly from the bottom of the table 14. The shaft 88 is rotatable in steps corresponding in degrees to the spacing of the steps on the cam 86. It is desirable that the setting of the race disc be controlled from a point remote from the machine and preferably electrically so that energization of a circuit, as by pressing a button type switch, will be effective to set the race discs simultaneously on a group of machines from race one to race two, and so on.

Therefore, in order to impart intermittent partial rotation to the shaft 88, a solenoid 89 is provided with an armature 90 retractable upon energization of the solenoid. The armature 90

(see Fig. 22) is connected by a spring 91 with a pawl disc 92 rotatable on the shaft 88 but limited in rotation by a pin 93 extending from one of the brackets 89 (see Fig. 20) and projecting through a slot 94. Upon energization of the solenoid 89, the armature is retracted to rotate the disc 92 through the arc permitted by the slot 94. Any further incidental retraction of the armature is taken up by the resiliency of the spring 91. Upon de-energization of the solenoid, a spring 95 connected with the pawl plate by a pin 96 returns the plate to its normal position. Upon each such oscillatory movement of the pawl plate effected by the solenoid and the spring 95, a pawl 97 thereon engages a ratchet 98 which is keyed to the shaft 88, advancing the ratchet one notch and consequently advancing the shaft and cam 86 a distance corresponding to one step of the cam. This, through the medium of the lever 82, advances the selector finger 58 one step inwardly. A pawl 99 is pivoted on the pin 93 and urged by a torsion spring 99a into engagement with the ratchet 98 so that on reverse movement of the pawl plate, the pawl 97, in being dragged over a ratchet tooth, can not impart reverse rotation thereto.

In order to prevent overthrow or movement of the shaft 88 through more than a single step, a ratchet-wheel 100 is pinned to the shaft 88 and a centering dog 101 is pivoted at 102 and carries a point 103 engageable with the ratchet-wheel 100 to cause the shaft to come to rest at the pre-determined points corresponding to the steps of the cam 86. The dog 101 is urged by a spring 104 into engagement with the ratchet-wheel, normally preventing rotation of the shaft 88, but when the armature is retracted, a pin 105 projecting from the pawl plate 92, which pin also serves as an anchor for the spring 91, engages a tail 106 of the dog 101, swinging it to the position illustrated in Fig. 23, out of engagement with the ratchet-wheel 100.

Through the mechanism just described, the race disc selecting mechanism is operable to cause the race disc and its associated code disc to print the number and symbol for any desired race or to print a symbol identifying the ticket as having been issued as the result of a trial operation of the machine. The switch which effects operation of the race disc selector mechanism need only be actuated once between successive races, and by using a rotary multiple contact switch with the contacts identified to correspond to the number of the race being run, it is possible to determine by glancing at the switch the race for which all the machines controlled by said switch are set.

*Entry disc selector mechanism*

The printing position of the entry disc 24 is determined by the number of the entry in a race upon which a bet is placed. The number so printed is controlled by a keyboard comprising two banks of keys 120, numbered from one to twelve, and a thirteenth key 170, marked T, which may be used for a trial operation of the machine. The mechanism connecting the keyboard with the entry disc 24 to effect printing of a number by said disc corresponding to the number of the key depressed is illustrated in Figs. 7 to 10 and Figs. 24 to 26. In Fig. 7 the selector cam 54, which cooperates with the entry disc, is shown as controlled by the selector finger 59 which corresponds to the selector finger 58 in its operation with the race disc. The selector finger 59 is carried by a block 121 mounted for sliding movement to and away from the axis of the selector plate 54 in a track 122. A lever 123 connects with the block 121 through a pin and slot connection 124. This lever is pivoted on a pin 125 carried by a bracket 126 depending from the lower surface of the table 14. At its lower end, the lever 123 is pivoted as shown to the upwardly extending end 135 of a link 127. As the length of the lever 127 constitutes a critical measurement in the assembly of the machine, the upwardly extending end 135 thereof is adjustably connected thereto by a bolt 136 and tapered coupling members 137 and 138 as shown in Fig. 10. The tapered male member 137 is fixed to the end 135 and fits into the tapered socket 138 which is fixed to the lever 127. This assembly permits swinging of the end to adjust the effective length of the lever, which may be fixed by tightening a nut 139 on the bolt 136 to draw the tapered coupling members into close contact. The opposite end of the link 127 is pivotally connected as at 128 to a lever 129 which is keyed to a shaft 130. There is a second shaft 131 identical with the shaft 130 and extending transversely of the machine forwardly thereof and parallel thereto. The shafts 130 and 131 are connected together to be oscillated simultaneously as shown in Fig. 9 by a pair of levers 132 and 133 keyed to the shafts and connected at their lower ends by a link 134. Thus upon oscillation of either of the shafts 130 or 131, the lever 129 will be oscillated and through the link 127 and lever 123 the selected finger 59 will be advanced or retracted a distance depending upon the degree of oscillation of said shafts 130 and 131. These shafts are adapted to be oscillated by depression of any one of the keys 120, and the degree of oscillation will depend upon the key depressed.

In Figs. 7, 24, and 25, the keys 120 are shown as supported on posts 140. Each post is provided with a collar 141 and is slidable through a spring cage 142 carrying a spring 143 bearing upwardly against said collar normally to retain the key in its uppermost position. Adjacent its lower end, each post 140 carries a forwardly projecting pin 151 engageable with a lever 152 which will be swung downwardly upon depression of the key. The lever 152 is fixed to a bushing 153 which also carries a downwardly extending lever 154. Depression of any one of the keys 120 swings its associated lever 152 downwardly so that a pin 155 on said lever engages beneath a latch 156 on a latch bar 157. The latch bar 157 extends transversely of the keyboard and carries a latch 156 for each of the keys in the bank with which it is associated. The latch bar 157 is mounted on parallel links 158 and 159 (see Fig. 24) which permit it to move to the side sufficiently for the pin 155 to engage under the latch 156. A spring 160 normally urges the latch bar to the right and retains the pin 155 and its lever 152 in latched position until depression of another key which effects release of the first key depressed and itself becomes latched. The lever 154, which is, as shown in Fig. 26, keyed to the same bushing 153 as is the lever 152, is swung to the right upon depression of the key, the tension of a torsion spring 161 normally urging it toward the left. A pin 163 carried by the lower end of this lever projects into a groove 164 (see Fig. 25) of a collar 165 which is slidable on a shaft 166, but splined against rotation relative to such shaft by a double spline as illustrated in Fig. 7. Each of the collars 165 carries a cam 167 which, upon sliding movement of the collar to the right, which is effected by depression of the key which controls it, moves into alignment with a cam lever 168 fixed to the shaft 130 or 131 as the case may be. It is to be understood that there are a pair of latch bars 157, one for each bank of keys and connected together for simultaneous movement, and that there are likewise a pair of shafts 166 and that each key controls a cam 167 on one of the shafts 166 through a mechanism identical with that just described. The cam levers 168 which depend from the shafts 130 and 131 are identical with the exception of that one shown at 129 in Fig. 7, which carries the pivot 128 at its lower end. The cams 167 are similar in shape but graduated in size. Their normal position is that shown with a flat side 169 registering with the lever 168. Upon each ticket printing operation of the machine, the shafts 166 are rotated forwardly through one complete revolution by the drive mechanism. Consequently the cam 167, which has been aligned with its lever 168, engages and oscillates that lever, imparting oscillation to the shafts 130 and 131, the degree of which oscillation will depend upon the size of the cam 167. As these cams are graduated in size corresponding to the number of the keys, the key depressed will determine the distance that the selector finger 59 is advanced prior to the printing operation and will further determine through the selector plate 54 the type face which is to be selected for printing.

For a test or trial operation of the machine, the selector mechanism remains in the position illustrated in Fig. 7, as none of the cams 167 controlled by the keys one to twelve inclusive is moved into operating position. In order to operate the machine without adjustment of the entry disc selector mechanism, and so that said entry disc will function to print a "T" rather than an entry number on the trial ticket issued, a try key shown at 170 in Fig. 25 is employed. The trial key 170 is mounted in the case in a manner similar to the keys 120, but has a post 171 which engages a vertically reciprocal slide 172. The slide 172 shown in Figs. 25 and 27 is provided with slots 173 through which shoulder screws 174 extend to guide it for vertical sliding movement on a bracket 175 which also serves as a bearing support for the shafts 130 and 131, and which supports a transversely extending plate 176 on which are formed bearings for the levers 152 and 154 hereinbefore described. The slide 172 has a rearwardly projecting arm 177 with vertical ears 178 at its opposite ends and a horizontal ear 179 intermediate its ends. Each of the ears 178 carries a pin 180 engageable with the extreme righthand latch 156 of the latch bars 157. A spring 181 urges the slide upwardly, and the post 171 of the try key 170 extends through a hole 183 bored in the bar 176 and engages the ear 179 to depress the slide. Depression of the slide by the try key in this manner causes the pins 180 to latch beneath the associated latches 156 and, in doing so, to release the lever 152 of any other key which may have been depressed and latched down.

*Starting switch operation*

In connection with the main drive of the machine, it will be pointed out that the motor from which the operating power is derived runs continuously, while the actual operation of the machine is controlled by a single cycle clutch, interposed between the motor and the power transmission. This clutch, as will also be set forth, is controlled by a solenoid. Depression of any one of the keys 120 or the try key 170 effects closing of a circuit to the solenoid which controls the main clutch. The circuit is closed by either one of a pair of switches 190 (see Figs. 8 and 24). In each of these switches, the lowermost contact is supported on a spring bridge 191 and the upper contact is carried by a block 192 of dielectric material secured to a switch bar 193. The two switch bars 193 lie directly in front of the latch bars 157 and are supported by pairs of parallel links 194 to permit them to be moved downwardly sufficiently to effect closing of the switch. A spring 195 urges the switch bar 193 upwardly to a position limited by a pin 196 projecting forwardly from the latch bar. Upon depression of any one of the keys 120, the pin 155 of its associated lever 152 engages the switch bar to swing it downwardly and close the switch 190. Upon depression of the try key 170, the pin 180 controlled thereby acts on the switch bar 193 in the same manner to close the switch. Upon operation of any of the keys as just described, the pin 155 or 180 which engages the switch bar to close the switch, returns to its latched position beneath its latch 156. In this position of the keys the switch is open but may subsequently be closed by the next operation either by the same or any other key.

A modified form of starting switch which is preferred where it is desired to prevent operation of the machine for an entry that has been scratched from a race is illustrated in Figs. 40 and 41. In this case, each of the keys on the keyboard will control a separate switch which embodies a housing 200 which embraces the key post and which supports a pair of contact members 201 retained in place within the housing by screws 202, which screws, upon being tightened, function to retain the contact members 201 in place through the medium of nuts 203, and also to clamp the ends of wires in transverse openings which extend diametricly through the nuts. The key post carries a dielectric bushing 204 which supports a contact bridging member 205. A spring 206 normally holds the key in its uppermost position, and depression of the key against the tension of the spring 206 brings the bridge 205 into contact with the members 201 to close a circuit to the clutch solenoid. Consequently, a switch in series with the key actuated switch just described, may be opened to prevent operation of the machine by any selected key and thus to prevent printing of a ticket on an entry that has been scratched from the race.

*Counter mechanism*

It is desired to register the sales of tickets issued for each entry separately. For this purpose twelve mechanical counters 221 of conventional design, one for each of the keys 120, are mounted on a bed plate 222 as shown in Figs. 7 and 37, in registry with sight openings 223 formed in the case. The counters 221 are arranged in three banks of four each and are connected for operation with their respective keys 120 in the following manner:

Referring again to Fig. 25, each of the collars 165 which carries a selector cam 167 on its right side also carries on its left side a counter actuating cam 224. The cams 224, as shown in Fig.

7, are circular with a flat side, which flat side, upon the collar 165 being moved to the right, registers with a lever 225. The levers 225 depend from the shafts 130 and 131, with respect to which they are free to oscillate, and their lower ends are connected by links 226 and 227 with the vertical arms 228 of a bank of bell cranks pivoted to the shaft 229 extending transversely of the machine. Horizontal arms 230 of the same bell cranks are connected each with one of the counters 221 by means of a flexible cable or, as shown in the present instance, a length of bead chain 231. The chains 231 lead through guide holes 232 in the bed plate 222 and connect with conventional actuating levers 233 of the counters. Thus upon depression of any one of the keys 123, the consequent shifting of its collar 165 and rotation of the shaft 166 causes the associated counter actuating cam 224 to turn through a complete revolution, rocking its lever 225 which, through the lever 226 or 227 as the case may be, rocks the bell crank which draws downwardly upon the chain 231 to actuate the counter associated with the key which was depressed, thus registering the sale of a ticket upon an entry identified by the number of said key and counter.

Each of the counters is provided with a lever 235 as shown in Fig. 1 by means of which it may be reset to zero. In order that all of the counters may be reset simultaneously, the levers 235 are connected, as by stiff springs 236, to sliding bars 237 guided in channels 238 secured to the top of the bed plate 222. There are four of the bars 237, one for each line of counters, and the forward lower edge of each bar is toothed to form a rack 239 which meshes with a gear 240 (see Figs. 37 to 39). The gears 240 are pinned to shaft 241 rotatable in bearings 242 and extending transversely of the machine. At one end the shaft 241 carries a lever 243 keyed to the shaft and pivoted at its lower end to a connecting rod 244 (see Figs. 37 and 39) which extends toward the rear of the machine where it is driven by a crank pin 245 in a crank disc 246. The crank disc 246 is normally stationary but may be caused to revolve 360° and on doing so oscillates the shaft 242 which, through the gears 240, reciprocates the bars 237 simultaneously to reset all of the counters to zero.

The means for rotating the crank disc 246 in order to reset the counters is best shown in Figs. 28 to 30, wherein the disc 246 is shown as the driven part of a single cycle clutch of which the driving part is shown at 247 and an intermediate disc at 248. The driving part 247 is carried by and rotates with a continuously rotating shaft 249. The driven part 246 as shown in Fig. 30, is fixed to a collar 250, which is integral with an inside member 251, which is housed within the member 247, which is drum-shaped. The member 251 is provided with peripheral chambers 252 for the reception of roller members 253. Upon rotation of the member 247 counter-clockwise as viewed in Fig. 29, the rollers 253 are wedged in the chambers to engage and drive the inner member 251, and thus the crank disc 246. Springs 255 engage the rollers 253 to urge them into the wedged or clutching position. The intermediate plate 248 carries peripherally spaced laterally projecting arcuate lugs 256 which project into the roller chambers 252, and also carries a radially projecting lug 257. In engaged position of the clutch the intermediate plate 248 rotates with the driving member 247 and the driven member 246. A stop member 258 cooperates with the lug 257 to intercept the plate 248, causing it to come to rest. Tendency toward continued rotation of the driven member thereupon causes the rollers to engage with the lugs 256 and hence to become dislodged from their wedged or driving position so that the member 246 comes to rest. In order, therefore, that the continuously rotating member 247 may impart a single revolution to the part 246, the stop 258 is withdrawn to permit the lug 257 to pass and to permit the rollers 253 to move into their wedging position. Upon the completion of a single cycle, the lug 257 again comes into contact with the stop 258 and the lugs 256 stop the rollers 253, imparting pressure on the springs 255 which tends to reverse the direction of the inner member 251. While the driven member is in its position of rest any tendency for it to move in reverse resulting from the tension of the springs 255 may be overcome by a latch 260 projecting from its periphery and engageable with a pivot pawl 261.

In addition to the counters which have been described for the purpose of registering the sale of tickets on individual entries, a total counter is provided or a counter which registers the total of all sales on all entries. This counter, which is illustrated at 209 in Figs. 37 and 39, is connected for actuation by a link 210 with a bell crank 211. The bell crank 211 is pivoted on shaft 229 and has a depending arm 212. The lower end of the arm 212 supports one end of a bar 213 which extends transversely of the machine directly behind the bell crank 228, which takes part in the operation of the counters for the individual entries. The opposite end of the bar 213 is supported as illustrated in Fig. 7 by an arm 214 which also depends from the shaft 229 and corresponds in length and shape to the arm 212 of the bell crank 211. As the bar 213 extends behind all of the bell cranks 228, movement of any one of said bell cranks to actuate one of the entry counters will swing the bar to the rear and rock the bell crank 211 which, through link 210, will actuate the counter 209. The dials of the counter 209 may be viewed through a suitable opening 209a as shown in Fig. 5.

As heretofore described, the driving member 247 of the counter reset clutch is continuously rotated by the shaft 249, which carries a gear 262 driven by the power transmission mechanism. It is desirable, in order to reset the counters of a group of machines simultaneously from a remote point, that the reset mechanism be controlled electrically. To accomplish this, the stop member 258 is adapted to be retracted momentarily to effect single cycle operation of the reset clutch through the medium of a solenoid 265. The solenoid 265 has a retractable armature 266 pivoted at its outer end to a short lever 267 fixed to a shaft 268. Also fixed to the shaft 268 is a long lever 269 connected at its lower end by a pin and slot connection 270 with stop member 258. The stop member 258 is slidably guided through a guide 271 and a spring 272 urges the stop member toward its stopping position. When it is desired to reset all of the counters to zero, a circuit is closed, energizing the solenoid 265 to retract its armature, and thus, through the levers 269 and 267, to retract the stop member 258, freeing the lug 257 and permitting rotation of the driven member of the clutch through a single cycle which effects the reset of the counter,

Strip feed and shearing mechanism

A strip of material such as paper or pasteboard upon which the tickets are printed is supplied in a roll indicated at 280 in Fig. 3, and contained by the housing 13. The strip is generally preprinted to indicate whether the ticket is to be sold on a "win," "place," or "show" machine, and may also have printed upon it any other desirable information such as the name of the track, the value of the ticket, etc. The strip is also perforated as shown at 281 in Fig. 6, the perforations being equally spaced to register with feeding teeth in the ticket feeding mechanism and to insure proper registry of the ticket during the printing operation. As shown in Figs. 3 and 4, the supply roll 280 is wound on a roll 283 supported on a shaft 284 journaled for rotation in a roller bearing 285 mounted in one side of the housing 13. Also carried by the shaft 284 for rotation therewith is a ratchet 286. A pawl 287, carrying a pin 288 journaled in a bearing 289 in the side of the housing 13 is urged by a spring 290 into engagement with the ratchet 286 to prevent rotation of the supply roll which might effect partial unwinding thereof and result in an uneven tension on the ticket strip. The strip is led from the supply roll upwardly as indicated in dotted lines at 291, after passing under a roller 292 carried by the upper end of the pawl 287. When tension is placed on the strip 291, as will be the case when the strip feed mechanism, presently to be described, commences to feed the strip through the machine, the pawl 287 is rocked around its pivot against the tension of the spring 290 sufficiently to cause its disengagement from the ratchet 286. Immediately upon release of ticket feeding tension, the pawl will return to the ratchet 286 and prevent further turning of the supply roll.

Also disposed within the housing 13 is a device for indicating that the supply of ticket strip is diminishing before it is exhausted. This device comprises a finger 294 pivoted as at 295 and carrying a feeler roller 296 engaging the periphery of the supply roll adjacent the top thereof and adapted by gravity to follow the periphery of the roll as it diminishes in diameter. As the finger 294 moves downwardly, a point 296a carried thereby engages the resilient contact member 297 of a switch 298, moving the same into contact with a contact member 299, thus closing the switch in a circuit which energizes a signal light in view of the machine operator and serves as a warning that the ticket supply roll is becoming exhausted. In order to insure positive operation of the switch 298, a torsion spring may be secured about the pivot 295 and bear against the finger 294 to supplement the force of gravity.

Referring now to Fig. 7, the ticket strip 291, after leaving the supply roll housing 13, enters between guides 300 and 301, by which it is guided upwardly to a position where it may overlie a feeding drum 302 also shown in Fig. 11. This drum is provided with feeding teeth 303 (see Fig. 11) which register with the perforations 281 in the ticket strip so that upon rotation of the drum the strip is fed between horizontally disposed edge guides 304 which carry it to a position below the printing head. The table 14, upon which the printing head is mounted, is provided with an opening 305 through which the printing platen operates. The ticket is supported as it passes over this opening by spaced strips 306, and is prevented from buckling or curling by spring fingers 307 mounted within the guide 304 and curving downwardly as they project therefrom to a position overlying the platen. From the printing station the strip continues over the top of the table 14 and is guided through an opening 308 in a shear head 309 which carries a blade 310 adapted to cooperate with a hardened insert 311 to shear the ticket. A rotating ejecting roller 312, preferably constructed of a resilient material such as rubber or the like, overlies the ticket strip at a point just before a delivery slot 313 formed in the lower edge of the rear wall of the housing 11.

During a ticket printing operation a shaft 320 rotates clockwise as viewed in Fig. 7 through 120° and then returns to its normal position. This shaft carries a quadrant gear 321 which meshes with a gear 322 rotatably mounted on a shaft 323, to which shaft the strip feeding drum 302 is secured. A ratchet 325 is also secured to this shaft and a pawl 326 pivoted to the side of the gear 322 engages with this ratchet to advance the same and the ticket feeding drum to feed the ticket strip one ticket length upon clockwise rotation of the quadrant 321. Upon counter-clockwise or reverse rotation of the quadrant, the pawl 326 rides over the ratchet 325 and a spring pawl 328 engages the ratchet to prevent reverse movement thereof. This feeding movement of the ticket strip follows the ticket printing operation and takes place just before the machine comes to rest. The ticket is printed against the printing head by operation of the platen through the opening 305, as will hereinafter be described, so that upon the next ticket strip advancing movement, the end of the newly printed ticket will be fed through the opening 308 in the shear head 309, the extreme end underlying the ejecting roller 312. The shear head 309 is supported for rocking movement on a shaft 330 and it carries a tail 331 which is engageable by a cam 332 fixed to a shaft 333. The shaft 333, also shown in Fig. 11, rotates clockwise once for each complete cycle of the machine and during this rotation the cam 332 engages the tail 331 to rock the shear head and cause the blade 310 to cooperate with the insert 311 to shear the ticket from the strip. An idler roller 334 is also carried by the shear head 309 and upon rocking movement thereof presses the ticket into engagement with the rotating ejector roller 312 so that the sheared ticket is advanced through the delivery slot 313.

The ejector roller 312 is, as previously stated, formed of resilient material such as rubber, and may be provided with annular grooves spaced to correspond with the portions of the ticket that have been printed upon so that during ejection of the ticket, in case ink has been used in printing, the ink is not smeared over the surface of the ticket or transferred on to the surface of the roll 312 from which it might be smeared or offset on to the next ticket issued. Preferably, however, the roll 312 is covered with a closely fitting cylinder of blotting paper or other absorbent material so that any wet ink which happens to be carried by the ticket will be blotted and consequently is not likely to be offset nor to soil the hands or gloves of the person receiving the ticket.

It is also desirable that tickets be marked in a manner to identify them with the particular machine by which they were issued. For example, a large number of machines such as that herein described may be employed to issue tickets at a single track. Should any ticket appear to have been issued by mistake or to show evidence of failure or misadjustment of the machine by which it was issued, it is convenient that that ticket be identifiable with the machine from which it issued. For this purpose, the feed roll 302 of each machine may, as shown in Fig. 11, have a serial number embossed at intervals on its surface to be impressed in the back of the ticket as the strip is fed over the roll. Such a serial number is shown at 340, and the spaces between the numbers are shown as filled by a raised or knurled band 341 so that a continuous impression will be made along the back of the ticket of spaced numbers identifying the ticket issued with the machine. It is preferable that these numbers be formed on the back of the ticket as they do not serve to identify the ticket for ordinary purposes and, being on the back, will not be confused with the numbers printed on the front of the ticket. In order to obtain the pressure necessary to impress the numbers embossed on the feed drum on to the back surface of the ticket strip, a pressure roller 342 is supported on the pivoted arm 343 and a torsion spring 344 urges the roller into engagement with the face of the ticket strip as it passes over the feed drum.

The printing platen, which is shown at 350 and which moves upwardly through the opening 305 in the table 14 to press the ticket strip against the selected type faces of the printing head after they have been moved to their lowermost or printing position, is carried on a frame 351. Fig. 11 shows a bottom view of the frame 351 and also shows the arrangement of spaced arms 352 by which it is supported, and which arms are supported for rocking movement about the same shaft 330 that supports the shear head. A pair of fingers 353 depend from the arms 352 and present lower ends positioned for engagement by cams 354 secured to and rotatable with the shaft 333 which, as before stated, rotates once for each operation of the machine. The cams 354 are so positioned on the shaft 333 that they engage the fingers 353 to rock the frame 351 and platen 350 upwardly about the supporting shaft 330 at a proper time to effect printing of the ticket strip by pressing it against the selected type. All of the type on the printing head is preferably embossed or raised by engraving so that the numerals printed upon the ticket will be impressed therein as a precaution against fraudulent alteration of the printed matter. The characters so impressed in the face of the ticket may, to facilitate reading, be colored either by ink or, according to the present invention, by a thermo-sensitive chemical with which the strip may be impregnated as will presently be described. Where ink is to be used for coloring the characters impressed on the ticket, it is preferably applied to the type face on the printing head through the medium of a belt 360 of absorbent material impregnated with ink and so arranged and positioned that the type face to be used in printing will pass over it during the rotary selecting movement of the disc members carried by the printing head. Details of construction of this inking mechanism are illustrated in Figs. 32 to 34.

In these figures, the inking belt 360 is shown as carried by spaced rollers 361 and 362. The roller 361 is mounted on a shaft 363, and a housing 364 which serves as a reservoir for ink and which encloses the belt and the rollers except for the side facing the printing head is supported for rocking movement about the shaft 363. A shaft 365 which supports the roller 362 extends through the lower portion of the housing. A torsion spring 366 wound exteriorly of the bearing at one end of the shaft 363 has an end engaging the housing and tending to rock the same toward the printing mechanism so that the inked belt will come into contact with the type face. A flexible cable or chain 367 is connected with one end of the lower shaft 365 and leads to a lever 368 pivoted at 369 and positioned for engagement by a cam 370 on the shaft 333 which rotates once for each ticket printing operation of the machine. At the commencement of the ticket printing operation, when the type discs of the printing head are being set, the low side of the cam 333 is riding on the lever 368 so that the ink belt contacts the type faces after the printing and during return movement of the type members, the high part of the cam 370 engages the lever 368 to move it downwardly and through the chain 367 to pull the inking mechanism away from the type face by rocking the housing 364 around its supporting shaft 363. During this rocking movement of the inking mechanism, the belt 360 is automatically advanced by the roller 361 so that it gradually passes through a supply of ink in the lower portion of the housing 364, which serves as a reservoir, and passes over a scraper formed by a depression in the rear of the housing, as shown in Fig. 19.

Cups 379a are preferably provided in the top of the housing as a means for replenishing the supply of ink from time to time. In order that the ink belt 360 will be advanced over the rolls 361 and 362 upon rocking movement of the housing, a coil spring 371a surrounding the shaft 363 adjacent one end forces the housing into engagement with a shoulder 372 adjacent its opposite end, creating a frictional engagement between the housing and the shaft so that rocking of the housing tends to impart rotation to the shaft. A one-way clutch 373 of the roller type serves as a bearing for the latter end of the shaft 363 and prevents rotation thereof in one direction. The inner member 374 of this clutch is secured to the shaft by a nut which presses it against the shoulder 372. Upon rocking of the housing in one direction, the shaft 363, which is preferably covered with a tightly fitting rubber sleeve, is held against rotation by the clutch 373 so that rocking movement of the housing causes the belt to advance over the shaft, the belt being free to pass over the lower roller 362 which is formed of metal and mounted for free rotation about the shaft 365. When the housing rocks in the opposite direction, the clutch permits the shaft 363 to move with the housing so that the movement of the belt is not reversed. The result is that upon successive operations of the machine which impart rocking movement to the inking mechanism, the belt thereof is advanced in one direction step by step to cause it to pass through the ink reservoir and always to present a freshly inked surface to the type face on the printing head.

Means for printing without the use of ink are illustrated in Fig. 31, wherein the platen 350 is shown as hollow and containing a heating element 376. A heating coil 377 enclosed in an arcuate case 378 may be disposed adjacent the printing head as shown. By the use of either the heated platen or heated type face, or both, the compression of the paper between the platen and type face during the printing operation may be caused to result in sufficient heating of the paper where it is compressed to change its color. With sufficient degrees of heat and pressure, any ordinary type of paper may be slightly oxidized or burned in this manner, with the result that the characters impressed in the paper will be sufficiently contrasted in color to make them clearly legible. To further facilitate such operation, the faces of the type members on the printing head are corrugated with fairly sharp angular grooves, preferably directed transversely of the type, and the surface of the platen is similarly corrugated as shown in Fig. 31, the ridges of the latter corresponding in position to the grooves of the former so that under printing pressure the ticket strip is tightly compressed and has closely spaced corrugations impressed on both sides. While ordinary burning of the paper such as results from the application of heat and pressure during the printing operation will impart a brownish tone to the characters printed thereon, the paper may be coated or impregnated with any one of a number of thermo-sensitive chemicals adapted upon being subjected to heat to change color so that a more brilliant color or a color contrasted more sharply with the color of the ticket strip may be obtained through the use of this same mechanism.

As an example of a chemical which may be used for this purpose, it has been found that if the paper is treated as by coating with an aqueous solution of cobalt salts, a relatively low degree of heat applied to the type or platen during the printing will result in a very dark printed character which stands out in marked contrast to any light colored paper.

*Motor and power transmission*

As shown in Fig. 1, a continuously operating electric motor 400 is enclosed in the motor housing 12 which depends from the bottom of the main case 10. Through suitable reduction gears enclosed in a housing 401 at one end of the motor, a sprocket 402 is driven, and, through a chain 403 leading over an idler roller 404, continuous rotation is imparted to the sprocket 405 secured to the outer member of a clutch 406, the inner or driven member of which is fixed to the main shaft 333. The clutch 406 is of the single cycle overrunning roller type identical in principle with the reset clutch illustrated in Figs. 29 and 30 and heretofore described in detail. Upon initiation of a ticket printing operation, the clutch is engaged for a single cycle to impart a complete rotation to the main shaft 333. From the rotation of this shaft is taken the power for operating the selector cams which are brought into operative position by depression of the keys 120, for rotating the main shaft of the printing head to effect selection of type to be printed, and for returning the same to its normal position, for raising the platen into printing position, for advancing the ticket strip after the printing has been accomplished, and for cutting off and ejecting the printed ticket.

Referring to Fig. 11, in which the main shaft 333 is illustrated as viewed from the bottom of the machine, a sprocket 407 is shown as keyed to the shaft and as carrying a chain 408 which, as shown in Fig. 1, drives a sprocket 409 on a shaft 410, which shaft also carries a gear 411 meshing with a gear 412 keyed to a shaft 413 upon which is mounted the ejector roller 312. The main shaft 333, as also shown in Fig. 11, carries a pair of platen actuating cams 354 which, as previously described, swing the platen upwardly to its printing station. The cam 370 is also carried on the shaft 333 and functions during rotation of the shaft to rock the inking mechanism in the manner illustrated and described in connection with Fig. 34. The ticket shearing knife is actuated by the cam 332, also carried by the main shaft. The counter-shaft 320, which supports the quadrant 321 for driving the strip feeding mechanism, therefore imparting rotation to the main shaft of the printing head, is also shown in Fig. 11 and is connected to the main shaft 333 through the medium of a double-acting Geneva movement mounted on another counter-shaft which, for convenience, will be referred to as the Geneva shaft 414. The outer end of this Geneva shaft 414 carries a sprocket 415 which, through a chain 416, drives a sprocket 417 carried by one of the pair of splined cam shafts 166 of the selector mechanism. A gear 418, also carried by said shaft, drives a gear 419 on the other shaft 166 through an intermediate idler 420. This imparts to the cam shafts 166 the complete rotation necessary to the operation of the selector mechanism during each ticket printing operation of the machine.

The Geneva movement, interposed between the main shaft 333 and the counter-shaft 320, is especially designed to transmit the uni-directional motion of the main shaft to rotation in opposite directions of the counter-shaft with intermediate dwell periods. As shown in Figs. 11, 35, and 36, the main shaft carries a gear 425 meshing with a gear 426 which rotates freely on the Geneva shaft 414, and which carries with it a Geneva driving member 427 adapted to drive a Geneva driven member 428 in one direction. Also carried by the main shaft is a gear 429 which, through a pinion 430, drives a gear 431 fixed to the Geneva shaft and carrying a Geneva member 432 like the member 427 but rotating in the opposite direction to impart such rotation to the Geneva driven member 428.

The construction of the driving and the driven members of the Geneva movement is illustrated in Figs. 35 and 36. In Fig. 35 the driven member 428 is shown in registry with the driving member 432. The driving member 427 shown in Fig. 36 lies directly behind the member 432 and rotates oppositely thereto and in a different phase position, its relative phase position being that shown in Fig. 36. The driven member 428 comprises a gear segment 435 at opposite ends of which are recesses 436 and 437 cut arcuately to the pitch diameter of the driving members 427 and 432. Each of these driving members has a set of gear teeth 438 cut to mesh with the teeth 435 of the driven member during a portion of their rotation, and at both ends of the teeth 438 are peripheral surfaces 439 and 440, formed on the pitch diameter of the teeth 438, for registry with the recesses 436 and 437 on the driven member to cause the same to dwell when the teeth of the driving members are not in driving engagement with the teeth of the driven member. The remainder of the periphery of each of the driving members is cut away for clearance, as shown at 441, to permit free rotation of the driven member while the other driving member is in mesh with the driven member to impart rotation to it.

As viewed in Fig. 35, the driving member 432 rotates continuously in counter-clockwise direction during rotation of the main shaft. In the position shown, its teeth 438 have just left their mesh with the teeth 435 of the driven member during which mesh the driven member was rocked in a clockwise direction to impart clockwise rotation to the shaft 320 which, as has been described, rotates the main shaft of the printing head to effect selection of the type to be printed. In the position shown, the surface 439 of the driving member registers with the recess 437 of the driven member, causing it to dwell until the time when the teeth of the driving member 427, which is moving in clockwise direction, will mesh with the teeth 435 of the driven member, imparting to it and the shaft 320 rocking movement in a counter-clockwise direction, which is effective to return the main shaft of the printing head to its normal position and to advance the ticket strip. The driving members 427 and 432 are identical in shape but operate in opposite directions to rock the shaft 320 intermittently in opposite directions and to cause it to dwell between its rocking motions.

The Geneva movement just described provides a decided advantage in a machine of this character because it is considerably smaller in overall dimensions than a conventional pin and slot Geneva that would be required to perform this function, and the rocking movement of the driven member is maintained at a constant speed while the gears of the Geneva members are in mesh, whereas in the pin and slot type of Geneva the movement of the driven member varies in speed during its operation due to the fact that the pin of the driving member varies in its position with respect to the center of the driven member.

The main clutch 406 is normally disengaged. It is permitted to engage for a single cycle to impart a complete rotation of the main drive shaft 333 once for each ticket printing operation of the machine. This clutch, as illustrated in Fig. 1, includes a lug 445 corresponding in function to the lug 257 of the clutch illustrated in Fig. 29. The hooked end 446 of the lever normally engages behind this lug and prevents engagement of the clutch. Upon raising of the hooked end 446 of this lever to clear the lug 445, the clutch engages and drives the main shaft 333 until the lug 445 again comes into contact with the end of the lever. The lever 447 is pivoted as at 448 and carries a downwardly extending pivot pawl 449. A spring 450 urges the pawl to the left and to a position substantially perpendicular to the lever 447, at which position it stops by reason of a shoulder 451 which engages with the bottom of the lever. The pawl thus normally assumes the position illustrated but is free to swing to the right against the tension of the spring 450. A solenoid 452 has a retractable armature 453 pivoted to a lever 454 which is in turn pivoted as at 455 at one end and engages with the pawl 449 at its opposite end. A spring 460 tends to hold the armature and the lever 454 upwardly in a position limited by a stop tail 461 on the lever. The solenoid 452 is energized by closing the switch 190 which occurs upon depression of one of the keys. This energization of the solenoid retracts the armature which, through the lever 454 and the pawl 449, swings the lever 447 about its pivot 448 to raise its end 446 free of the lug 445. The end of the pawl 449 swings away from the lever 454 during this operation, its movement being on an arc struck from the center of the pivot 448. Consequently, a single cycle operation is insured even though the operator should fail to release the key which effects energization of the solenoid.

If, due to such improper operation, the solenoid and lever 454 remain in their down position, the spring 450 returns the pawl 449 and the lever 447 to normal, and, in being returned, the pawl 449 rides over the end of the lever 454. Upon subsequent de-energization of the solenoid the lever 454 will rise about its pivot under the tension of the spring 460 and, in so doing, its end will swing the pawl out of the way and come to rest in the position illustrated. Thus upon depression of any key on the keyboard, the clutch 406 will engage for a single cycle only to drive the machine through a single complete ticket printing and issuing operation.

The construction of the clutch 406 differs from the clutch shown in Fig. 29 in that it does not comprise a latch and pawl arrangement such as shown at 260 and 261. This is unnecessary in the main clutch owing to the fact that at the completion of its single cycle operation the shear operating cam 332, as illustrated in Fig. 7, comes to rest with the tail 331 of the shear head directly behind its shoulder in a position positively preventing any reverse rotation of the shaft 333 or the connected driven member of the clutch.

*Multiple ticket printing control*

Tickets are ordinarily sold singly through operation of the mechanism in the manner described. There are, however, many sales of tickets in groups, and the present invention contemplates means for automatically issuing any desired number of tickets on a single entry in rapid succession and upon a single depression of the key corresponding to the entry upon which the tickets are sold. To accomplish this, a manually rotatable numbered dial is provided for operation by the ticket vendor, and associated with the clutch actuating member in a manner to permit the clutch to rotate a number of times determined by the setting of the dial and therefore to cause the machine to issue through continuous operation that number of tickets upon a single depression of a key.

This mechanism is illustrated in Figs. 1 and 2, wherein the control dial is illustrated at 470 as being drum-shaped and provided with peripherally spaced numbers, for example, from 1 to 20, which may be brought into alignment with the reference line 471 on the exterior of the case 10, and which will determine the number of tickets to be issued. The control dial 470 is fixed to the end of a shaft 472 which is supported for rotation in bearing brackets 473 and 474. The opposite end of the shaft 472 carries a drum 475, the edge of which is provided with a notch 476. The clutch lever 447 has a long tail 477 at the end of which a roller 488 is carried by a pivoted support 489, which is free to swing upwardly about its pivot, but which is limited in its downward swinging movement at a point normally supporting the roller in a horizontal position. When the dial 470 is set at one, the notch 476 in the drum 475 is in its uppermost position where it is disposed directly beneath the roller 488. Consequently, upon clutch releasing movement of the lever 447, the tail 477 thereof swings down and up and the roller 488 passes freely through the notch 476 without interruption by the drum 475. To print more than one ticket, the dial is set to the number desired, moving the notch 476 out of registry with the roller 488 as shown in Fig. 1. Consequently, upon downward movement of the roller which results from a clutch releasing movement of the lever 447, it strikes the periphery of the drum, the support 489 pivots upwardly, and the roller 488 falls to a position within the drum where it engages the inner surface thereof and remains, permitting continued engagement of the clutch until the notch 476 is again brought into registry with the roller 488 and the clutch lever is permitted to move to its clutch disengaging position.

In order to rotate the drum so that the notch 476 approaches its uppermost or release position upon the sale of the number of tickets that has been pre-determined by setting of the dial 470, a worm 490 is keyed to one end of one of the selector cam shafts 166 and meshes with a worm gear 491 carried by a hub 492 which is rotatable on the shaft 472. The hub 492 also carries a disc 493 to which, as shown in Fig. 2, there is pivoted a pawl 494 which, by means of a spring 495, is drawn into engagement with a star-wheel 496. The star-wheel 496 is carried by a hub 497 which is keyed to the shaft 472. The driving ratio of the worm 490 and worm gear 491 is such that upon each operation of the machine which results in a complete rotation of the worm 490, the worm gear 491 is driven through one-twentieth part of a rotation, this being on the assumption that the dial 470 is numbered from one to twenty. It is to be understood, however, that this mechanism may be designed to print a total of more than twenty tickets if desired. Rotation of the worm gear 491, therefore, effects rotation of the disc 493, and through the medium of the pawl 494 and star-wheel 496, the shaft 472 is rotated one-twentieth of a revolution for each ticket printing operation. Consequently, if the dial 470 has been set to five to print five tickets, a continuous operation of the machine will effect rotation of the shaft 166 five times, at which time the shaft 472 and the drum 475 will have been returned to normal position, so that the notch 476 will release the roller 488 on the clutch lever 447 with the result that the clutch will be disengaged. The spring pressed pawl 494 and star-wheel 496 afford sufficient driving connection to effect rotation of the shaft 472 in the manner just described, but the resiliency of the spring 495 also permits rotation of the shaft manually through the medium of the dial 470 in order that it may be set to the number corresponding to the number of tickets desired to be issued. A lug 498, projecting radially from the hub 497, engages with a stop member 499 when the dial has been turned to its number one position, thus preventing rotation of the drum 475 during normal operation of the machine to print a single ticket. The star-wheel and pawl 494, in addition to serving as a friction drive for the shaft 472, also serve as a centering means for setting the wheel 470, as the notches in the star-wheel correspond in number and in spacing to the numbers on the dial.

*Electric circuit*

A simplified wiring diagram for the machine and the electrical controls thereof is illustrated in Fig. 43, wherein a main circuit from which the power for operating the machine is derived is indicated as comprising a pair of conductors 500. Conductors 501 leading therefrom energize a clutch actuating solenoid 502. The circuit to the solenoid 502 may be closed by any one of a group 503 of switches one to twelve which represent the key actuated switches illustrated in Fig. 40, and which are closed by depression of the entry selecting keys one to twelve respectively. In series with the key switches 503 are a bank of entry scratching switches 504 which are normally closed, and which are preferably positioned remote from the machine or in a control room. In the event that any of the entries represented by the keys one to twelve has been scratched from a race, the corresponding entry scratching switch 504 will be opened so that accidental depression of the key will not complete a circuit to the clutch actuating solenoid 502. It is to be understood that the entry scratching switches 504 will be arranged in a circuit common to their respective switches on all the machines at the track. Consequently, if entry number one has ben scratched from the race, switch 504—1 will be opened with the result that it will be impossible to print a ticket for that entry by depression of key 503—1 on any machine. This presents a decided advantage over systems heretofore in use in which it has been necessary to adjust each machine individually to correspond with the scratching of any single entry.

Also included in the circuit 501 is a main switch 505, preferably positioned in the control room, which may be opened to prevent operation of any machine. An indicator lamp 506 in this circuit is positioned in each machine to notify the machine operator that the switch 505 has been closed and that the machine is ready for operation. The lamp 506 will occupy a position beneath the faceted glass 507 illustrated in Fig. 5.

The motor 490 is energized by a circuit 508 which is connected with the main circuit 500 and is controlled by a switch 509. An indicator lamp 510, which is connected in parallel with the motor 490, burns beneath the faceted glass 511 to indicate to the operator that the switch 509 is closed. A circuit 512 energizes an indicator lamp 513 which burns beneath the glass 514 (see Fig. 5), and this circuit 512 is controlled by the switch 297 in the ticket strip housing 13, so that when the supply of ticket strip is nearly exhausted, the operator will be notified by the burning of the lamp 513. The solenoid 265, which actuates the counter reset mechanism, is energized by a circuit shown at 515 and is controlled by a switch 516, also preferably disposed in the control room.

The race wheel control solenoid 452 is energized by a circuit 517, which circuit is adapted to be controlled by a rotary switch indicated at 518. The construction of the rotary switch 518 is shown in Fig. 42 of the drawings as comprising a rotatable contact member having peripherally spaced contact points 519 separated by dielectric spacers 520. A resilient contact member 521 bears against the periphery of the rotor 518 so that upon rotation thereof the circuit to the race solenoid 452 is automatically opened and closed. In order that the position of the race wheel, which is actuated by the race solenoid, may be determined from the position of the switch, the rotor 518 is mounted on a Geneva disc 522 which has twelve peripheral slots 523 and twelve corresponding dwell positions. A Geneva pin 524 is carried by a disc 525 which may be rotated in one direction only by a hand knob 526 to move the Geneva disc and the rotor 518 from one dwell position to the next. The dwell positions of the Geneva disc are numbered one to twelve as illustrated, and this numbering corresponds to the positioning of the race wheel of the printing mechanism. In operation, the knob 526 is rotated once after each race so that the pin 524 advances the Geneva disc one position, during which advancing movement the contact member 521 closes a circuit with one of the contact members 519 to energize the race wheel solenoid 452 and to set the Geneva disc in a position which will indicate the numeral to be printed by the race wheel.

In Fig. 44, a modification of the circuit 591 is shown for operating the clutch actuating solenoid 502, and in this figure the switches 191, illustrated in Figs. 8 and 24, are shown as connected in parallel so that closing of either switch will close the circuit to the clutch solenoid. Switches 191 are those that are closed upon downward movement of the latch bars 193 which move downwardly upon depression of the entry selecting keys.

It is customary to employ a large number of ticket printing and issuing machines at a track, and operation of the machines is registered on a common totalizing mechanism. The present invention is not concerned with any details of a totalizing mechanism, although machines constructed in accordance with this invention are readily adapted to use with any electrically actuated totalizing mechanism. In order that issuing of a ticket by the present machine will effect an electric impulse to energize an electrically actuated totalizing unit, a circuit 530 which leads to the electric totalizer may be closed by any one of a bank of switches 531. These switches are numbered one to twelve, corresponding with the entries, and, as is common practice, are adapted to close the circuit 530 selectively to twelve separate electrically actuated counting devices included in the totalizing unit not shown. The construction of the switches 531 in the present machine is illustrated in Fig. 7, in which one of the switches is shown as comprising a pair of resilient arms with normally spaced contact members. The switches 531, which are twelve in number, are disposed beneath the bell cranks 230 which operate the counters as hereinbefore described. Consequently downward movement of any one of the bell cranks 230 engages the uppermost of the resilient arms of its corresponding switch 531 and closes the circuit 530, by which an impulse is sent to the corresponding counter of the totalizer unit.

While the foregoing description has been made specific for purposes of illustration, it is not to be taken as limiting the invention to the specific form and mechanism shown, most of which may be varied in construction and mechanical arrangement, all within the scope of the appended claims.

Having thus described our invention, what we claim and desire to secure by Letters Patent is

1. In a machine of the character described, a printing head comprising a rotatable type member with peripherally spaced type characters thereon, a stop member associated with the type member to effect selection of type thereon for printing, and a pin and slot connection between said type member and stop member whereby movement of the type member will continue beyond that of the stop member to insure contact of all of its type characters with an inking device, said continued movement of the type member being effective to bring the selected type thereon to printing position.

2. In a machine of the character described, a printing head comprising a rotatable type member with peripherally spaced type characters thereon, a shaft supporting said type member, a spring connecting the shaft and type member whereby the shaft will drive the type member and may rotate a limited distance after the type member stops, brake means operable to create a drag between the type member and the shaft upon the stopping of the type member to prevent rebound of the type member, a stop member associated with the type member to effect selection of type thereon for printing, and a pin and slot connection between said type member and stop member whereby movement of the type member will continue beyond that of the stop member to bring the selected type thereon to printing position.

THOMAS A. KEEN.
JAMES KILBURG.